US012695874B2

(12) United States Patent
Choi et al.

(10) Patent No.: US 12,695,874 B2
(45) Date of Patent: Jul. 28, 2026

(54) IMAGE ENCODING METHOD AND APPARATUS, AND IMAGE DECODING METHOD AND APPARATUS

(71) Applicant: SAMSUNG ELECTRONICS CO., LTD., Suwon-si (KR)

(72) Inventors: Ki-ho Choi, Seoul (KR); Min-soo Park, Seoul (KR); Elena Alshina, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 16/617,286

(22) PCT Filed: Jul. 4, 2018

(86) PCT No.: PCT/KR2018/007581
§ 371 (c)(1),
(2) Date: Nov. 26, 2019

(87) PCT Pub. No.: WO2019/009618
PCT Pub. Date: Jan. 10, 2019

(65) Prior Publication Data
US 2021/0127112 A1     Apr. 29, 2021

Related U.S. Application Data

(60) Provisional application No. 62/528,482, filed on Jul. 4, 2017.

(51) Int. Cl.
*H04N 19/12* (2014.01)
*H04N 19/11* (2014.01)
(Continued)

(52) U.S. Cl.
CPC ............. *H04N 19/12* (2014.11); *H04N 19/11* (2014.11); *H04N 19/122* (2014.11);
(Continued)

(58) Field of Classification Search
None
See application file for complete search history.

(56) References Cited

U.S. PATENT DOCUMENTS 8,494,296 B2   7/2013   Alshina et al.
8,532,416 B2   9/2013   Alshina et al.
(Continued)

FOREIGN PATENT DOCUMENTS

KR   10-2011-0017303 A   2/2011
KR   10-2011-0045949 A   5/2011
(Continued)

OTHER PUBLICATIONS

Communication dated Mar. 4, 2020 from the European Patent Office in application No. 18829013.4.
(Continued)

*Primary Examiner* — Mohammed Jebari
(74) *Attorney, Agent, or Firm* — Sughrue Mion, PLLC

(57) ABSTRACT

Provided are an image decoding method and an image decoding apparatus for performing the image decoding method, the image decoding method including: determining whether or not to obtain second transform set information; determining the second transform set information based on the determining of whether or not to obtain the second transform set information; selecting any one second transform set applied to a second transform block from among a plurality of second transform set candidates corresponding to a plurality of prediction modes, by using the determined second transform set information; generating a first transform block by inverse-transforming the second transform block based on a plurality of transform matrices included in the selected second transform set; and generating a residual
(Continued)

block corresponding to the first transform block by inverse-transforming the first transform block based on a first transform matrix.

6 Claims, 20 Drawing Sheets

(51) Int. Cl.

| | |
|---|---|
| *H04N 19/122* | (2014.01) |
| *H04N 19/157* | (2014.01) |
| *H04N 19/176* | (2014.01) |
| *H04N 19/18* | (2014.01) |
| *H04N 19/184* | (2014.01) |
| *H04N 19/593* | (2014.01) |
| *H04N 19/61* | (2014.01) |
| *H04N 19/625* | (2014.01) |

(52) U.S. Cl.
CPC ......... *H04N 19/157* (2014.11); *H04N 19/176* (2014.11); *H04N 19/18* (2014.11); *H04N 19/184* (2014.11); *H04N 19/593* (2014.11); *H04N 19/61* (2014.11); *H04N 19/625* (2014.11)

(56) References Cited

U.S. PATENT DOCUMENTS

| | | | | |
|---|---|---|---|---|
| 8,693,795 | B2 | 4/2014 | Fernandes | |
| 8,929,673 | B2 | 1/2015 | Alshina et al. | |
| 10,178,411 | B2 * | 1/2019 | Sole ........................ | H04N 19/70 |
| 10,356,413 | B1 * | 7/2019 | Sim ........................ | H04N 19/12 |
| 10,390,044 | B2 | 8/2019 | Karczewicz et al. | |
| 10,979,709 | B2 * | 4/2021 | Moon ................... | H04N 19/159 |
| 2010/0150226 | A1 * | 6/2010 | Hallapuro .............. | H04N 19/61 |
| | | | | 375/240.03 |
| 2011/0135212 | A1 | 6/2011 | Alshina et al. | |
| 2012/0082391 | A1 * | 4/2012 | Fernandes .............. | H04N 19/42 |
| | | | | 382/233 |
| 2014/0254661 | A1 | 9/2014 | Saxena et al. | |
| 2015/0281714 | A1 * | 10/2015 | Makela ................... | H04N 19/63 |
| | | | | 382/234 |
| 2017/0094313 | A1 | 3/2017 | Zhao et al. | |
| 2017/0094314 | A1 * | 3/2017 | Zhao ..................... | H04N 19/625 |
| 2017/0295380 | A1 * | 10/2017 | Huang ................... | H04N 19/12 |
| 2018/0014017 | A1 * | 1/2018 | Li .......................... | H04N 19/127 |
| 2018/0020218 | A1 * | 1/2018 | Zhao ..................... | H04N 19/103 |
| 2018/0103252 | A1 * | 4/2018 | Hsieh ..................... | H04N 19/18 |
| 2018/0302631 | A1 * | 10/2018 | Chiang ................. | H04N 19/157 |
| 2019/0007705 | A1 * | 1/2019 | Zhao ...................... | H04N 19/61 |
| 2019/0104322 | A1 * | 4/2019 | Tsukuba ................. | H04N 19/70 |
| 2019/0149822 | A1 * | 5/2019 | Kim ....................... | H04N 19/70 |
| | | | | 375/240.02 |
| 2021/0235086 | A1 * | 7/2021 | Sim ...................... | H04N 19/119 |
| 2021/0297701 | A1 * | 9/2021 | Tsukuba ................. | H04N 19/61 |

FOREIGN PATENT DOCUMENTS

| | | | | |
|---|---|---|---|---|
| KR | 10-2011-0065092 | A | 6/2011 | |
| KR | 10-2012-0034582 | A | 4/2012 | |
| KR | 10-2015-0129715 | A | 11/2015 | |
| KR | 10-1618021 | B1 | 5/2016 | |
| WO | WO-2019231206 | A1 * | 12/2019 | .......... H04N 19/105 |
| WO | WO-2019240050 | A1 * | 12/2019 | .......... H04N 19/105 |

OTHER PUBLICATIONS

Jang, H., et al., "Adaptive NSST Kernel Size Selection", Joint Video Exploration Team (JVET) of ITU-T SG 16 WP 3 and ISO/IEC JTC 1/SC 29/WG 11, Document: JVET-E0047, Jan. 12-20, 2017, XP030150519, pp. 1-6.

Zhao, X., et al., "TU-level non-separable secondary transform", Joint Video Exploration Team (JVET) of ITU-T SG 16 WP 3 and ISO/IEC JTC 1/SC 29/WG 11, Document: JVET-B0059, Feb. 20-26, 2016, XP030150066, pp. 1-5.

Ma, Z., et al., "Harmonizing ROT and SDIP", Joint Collaborative Team on Video Coding (JCT-VC) of ITU-T SG16 WP3 and ISO/IEC JTC1/SC29/WG11, Document: JCTVC-F295, Jul. 14-22, 2011, XP030009318, pp. 1-3.

Choi, K., et al., "CE6: NSST with modified NSST sets and signaling (Test2.3)", Joint Video Experts Team (JVET) of ITU-T SG 16 WP 3 and ISO/IEC JTC 1/SC 29/WG 11, Document: JVET-K0174-v1, Jul. 10-18, 2018, XP030195661, 8 pages.

Elena Alshina et al., "CE7: Experimental results of fast ROT by Samsung", JCTVC-D357, Joint Collaborative Team on Video Coding (JCT-VC) of ITU-T SG16 WP3 and ISO/IEC JTC1/SC29/WG11, 4th Meeting, Daegu, KR, Jan. 15, 2011, 10 pages.

Written Opinion (PCT/ISA/237) and International Search Report (PCT/ISA/210) dated Oct. 19, 2018 issued by the International Searching Authority in International Application No. PCT/KR2018/007581.

Communication issued Jul. 9, 2021 by the European Patent Office in counterpart European Patent Application No. 18829013.4.

Communication dated Feb. 21, 2024, issued by the European Patent Office in European Application No. 18829013.4.

* cited by examiner

| BLOCK SHAPE / DEPTH | 0: SQUARE | 1: NS_VER | 2: NS_HOR |
|---|---|---|---|
| DEPTH D | 1800 | 1810 | 1820 |
| DEPTH D+1 | 1802 | 1812 | 1822 |
| DEPTH D+2 | 1804 | 1814 | 1824 |
| ... | ... | ... | ... |

IMAGE ENCODING METHOD AND APPARATUS, AND IMAGE DECODING METHOD AND APPARATUS

TECHNICAL FIELD

The disclosure relates to an image encoding method and apparatus, and an image decoding method and apparatus. More particularly, the disclosure relates to methods and apparatuses for encoding and decoding coefficients of a frequency domain.

BACKGROUND ART

According to most image encoding and decoding methods and apparatuses, an image of a pixel domain is transformed into an image of a frequency domain and is encoded, for image compression. Discrete cosine transform (DCT) is a widely known technique used for image or voice compression. In recent years, many attempts have been made to find more efficient encoding methods. In audio encoding, parametric encoding shows better results than DCT, and with respect to two-dimensional (2D) data, coefficients of Karhunen Loeve transform (KLT) have minimum bit sizes, but the volume of overhead information is significantly increased.

DESCRIPTION OF EMBODIMENTS

Technical Problem

Provided are an image encoding method and apparatus, and an image decoding method and apparatus providing efficient compression and having minimum overhead information.

Solution to Problem

One or more embodiments provide an image decoding method including: determining whether or not to obtain second transform set information; determining the second transform set information based on the determining of whether or not to obtain the second transform set information; selecting any one second transform set applied to a second transform block from among a plurality of second transform set candidates corresponding to a plurality of prediction modes, by using the determined second transform set information; generating a first transform block by inverse-transforming the second transform block based on a plurality of transform matrices included in the selected second transform set; and generating a residual block corresponding to the first transform block by inverse-transforming the first transform block based on a first transform matrix.

One or more embodiments provide an image encoding method including: generating a first transform block by transforming a residual block based on a first transform matrix; selecting any one second transform set applied to the first transform block from among a plurality of second transform set candidates corresponding to a plurality of prediction modes; and generating a second transform block by transforming the first transform block based on a plurality of transform matrices included in the selected second transform set.

One or more embodiments include an image decoding apparatus including at least one processor configured to: determine whether or not to obtain second transform set information; determine the second transform set information based on the determining of whether or not to obtain the second transform set information; select any one second transform set applied to a second transform block from among a plurality of second transform set candidates corresponding to a plurality of prediction modes, by using the determined second transform set information; generate a first transform block by inverse-transforming the second transform block based on a plurality of transform matrices included in the selected second transform set; and generate a residual block corresponding to the first transform block by inverse-transforming the first transform block based on a first transform matrix.

Advantageous Effects of Disclosure

According to an image encoding method and apparatus, and an image decoding method and apparatus according to the disclosure, efficient compression may be provided and minimum overhead information may be generated. Thus, in overall, the amount of data to be stored or to be transmitted to a decoder may be reduced.

BRIEF DESCRIPTION OF DRAWINGS

FIG. 15 illustrates that a shape into which a second coding unit is splittable is restricted when the second coding unit having a non-square shape, which is determined by splitting a first coding unit, satisfies a predetermined condition, according to an embodiment.

FIG. 16 illustrates a process of splitting a square coding unit when split shape mode information indicates that the square coding unit is not to be split into four square coding units, according to an embodiment.

FIG. 18 illustrates a process of determining a depth of a coding unit as a shape and size of the coding unit change, when the coding unit is recursively split such that a plurality of coding units are determined, according to an embodiment.

BEST MODE

Figure 1:
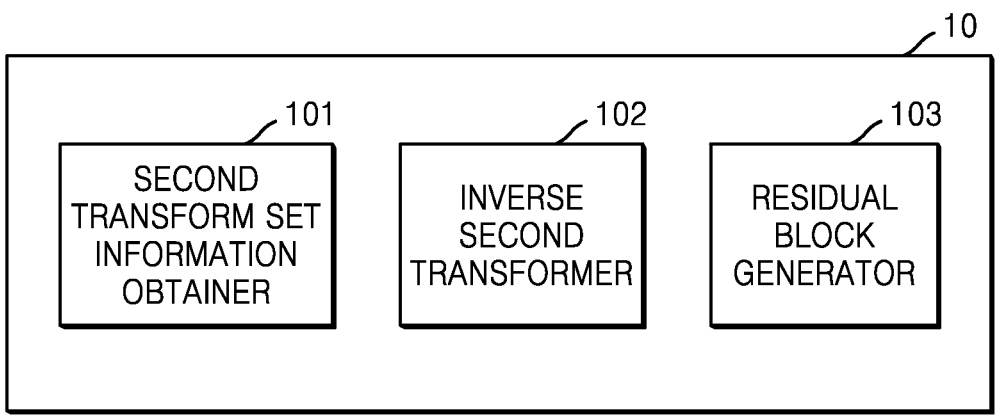
FIG. 1 is a block diagram of an image decoding apparatus according to an embodiment.

One or more embodiments provide an image decoding method including: determining whether or not to obtain second transform set information; determining the second transform set information based on the determining of whether or not to obtain the second transform set information; selecting any one second transform set applied to a second transform block from among a plurality of second transform set candidates corresponding to a plurality of prediction modes, by using the determined second transform set information; generating a first transform block by inverse-transforming the second transform block based on a plurality of transform matrices included in the selected second transform set; and generating a residual block corresponding to the first transform block by inverse-transforming the first transform block based on a first transform matrix.

One or more embodiments provide an image encoding method including: generating a first transform block by transforming a residual block based on a first transform matrix; selecting any one second transform set applied to the first transform block from among a plurality of second transform set candidates corresponding to a plurality of prediction modes; and generating a second transform block by transforming the first transform block based on a plurality of transform matrices included in the selected second transform set.

One or more embodiments include an image decoding apparatus including at least one processor configured to: determine whether or not to obtain second transform set information; determine the second transform set information based on the determining of whether or not to obtain the second transform set information; select any one second transform set applied to a second transform block from among a plurality of second transform set candidates corresponding to a plurality of prediction modes, by using the determined second transform set information; generate a first transform block by inverse-transforming the second transform block based on a plurality of transform matrices included in the selected second transform set; and generate a residual block corresponding to the first transform block by inverse-transforming the first transform block based on a first transform matrix.

Mode of Disclosure

The advantages and features of the disclosure and methods of achieving the advantages and features will become more apparent by referring to embodiments to be described below with reference to the accompanying drawings. The disclosure, however, may be embodied in many different forms and should not be construed as being limited to the embodiments set forth herein; rather these embodiments are provided so that this disclosure will be thorough and complete, and will fully convey the concept of the disclosure to one of ordinary skill in the art.

Terms used in this specification will be briefly described and the disclosure will be described in detail.

The terms used in the disclosure are selected as general terms as possible, which are currently widely used, in consideration of their functions in the disclosure. However, the terms may be changed according to intentions of technicians in the related art, precedents, or the advent of new technologies. Also, some of the terms used herein may be arbitrarily chosen by the applicant. In this case, these terms are defined in detail below in the detailed description. Thus, the terms used herein should be understood based on the unique meanings thereof and the whole context of the disclosure.

As used herein, the singular forms "a," "an" and "the" are intended to include the plural forms as well, unless the context clearly indicates otherwise.

Throughout the specification, it will be further understood that when a part "includes" or "comprises" an element, unless otherwise defined, the part may further include other elements, not excluding the other elements. Also, the term "unit" used in the specification may denote software, or a hardware component, such as FPGA or ASIC, and may perform certain functions. However, the "unit" is not limited to software or hardware. The "unit" may be configured to be included in a storage medium which may perform addressing, or may be configured to reproduce one or more processors. Thus, for example, the "unit" may include software components, object-oriented software components, class components and task components, processors, functions, attributes, procedures, sub-routines, segments of program codes, drivers, firmware, micro codes, circuits, data, databases, data structures, tables, arrays, and variables. Functions provided by the components and the "units" may be integrated into a smaller number of components and the "units," or may further be separated into additional components and the "units."

Hereinafter, an "image" may indicate a static image, such as a still image of a video, or a dynamic image, that is, animated moving image, such as a video.

Hereinafter, a "sample" is data assigned to an image sampling location and may denote data to be processed. For example, pixel values in an image of a spatial domain and transform coefficients on a transform area may be samples. A unit including least one of the samples may be defined as a block.

Hereinafter, embodiments of the disclosure will be described in detail with reference to the accompanying drawings so that one of ordinary skill in the art may easily execute the embodiments. Also, parts not related to the descriptions will be omitted to clearly describe the disclosure.

Hereinafter, an image encoding apparatus and an image decoding apparatus, and an image encoding method and an image decoding method will be described in detail with reference to FIGS. 1 through 21. A method of determining a data unit of an image will be described according to an embodiment with reference to FIGS. 8 through 21 and image encoding and decoding methods and apparatuses performing a second transform by using a second transform set including a transform matrix will be described with reference to FIGS. 1 through 7.

In the disclosure, the second transform denotes transform into a second transform block with respect to a first transform block.

In more detail, in an image encoding process using an image encoding apparatus, a residual block may be transformed into a first transform block via first transform, the first transform block may be transformed into a second transform block via second transform, and the second transform block may be transformed into a quantized second transform block via quantization.

Inversely, in an image decoding process using an image decoding apparatus, the quantized second transform block may be transformed into the second transform block via inverse quantization, the second transform block may be transformed into the first transform block via inverse second transform, and the first transform block may be transformed into the residual block via inverse first transform.

FIG. 1 is a block diagram of an image decoding apparatus 10 according to an embodiment.

The image decoding apparatus 10 may include a second transform set information obtainer 101, an inverse second transformer 102, and a residual block generator 103. Alternatively, the second transform set information obtainer 101, the inverse second transformer 102, and the residual block generator 103 may correspond to one processor or a plurality of processors interactively operating with each other.

The image decoding apparatus 10 may determine whether or not to obtain the second transform set information.

The image decoding apparatus 10 may determine whether or not to obtain the second transform set information based on at least one of a size, a shape (that is, a ratio of a width to a height of the second transform block), a prediction mode, whether or not to use a specific encoding tool, the number of non-zero coefficients, a sum of the squares of the non-zero coefficients, a depth, and a quantization parameter of the second transform block.

Here, the number of non-zero coefficients and the sum of the squares of the non-zero coefficients of the second transform block, which are used to determine whether or not to obtain the second transform set information, may denote the number of non-zero coefficients, which are included in the second transform block, and the sum of the squares of the non-zero coefficients, wherein quantization of the second transform block is completed after transformation.

Also, whether or not to obtain the second transform set information may be determined based on whether or not to use the specific encoding tool. Here, the encoding tool used to determine whether or not to obtain the second transform set information may include at least one of multiple-type tree partition (MTT), adaptive motion vector resolution (AMVR), ultimate motion vector expression (UMVE), affine motion prediction, inter prediction refinement (IPR), decoder-side motion vector refinement (DMVR), bi-directional optical flow (BIO), multiple core transform (MTR), spatial varying transform (SVT), scan region-based coefficient coding (SRCC), transform domain residual sign prediction (TD-RSP), multi-hypothesis probability update (MCABAC), multi-parameter intra (MPI), and position dependent intra prediction combination (PDPC). However, the encoding tool is not necessarily limited thereto.

When it is determined not to obtain the second transform set information, the image decoding apparatus 10 may not inverse-transform the second transform block or may generate the first transform block by inverse-transforming the second transform block based on a second transform set.

For example, when a multiple core transform tool is used for encoding of the first transform block, the image decoding apparatus 10 may not obtain the second transform set information, and may not inverse-transform the second transform block or may generate the first transform block by inverse-transforming the second transform block based on the second transform set.

As another example, when the sum of the squares of the non-zero coefficients of the quantized second transform block is greater than a certain threshold value, the image decoding apparatus 10 may not obtain the second transform set information, and may not inverse-transform the second transform block or may generate the first transform block by inverse-transforming the second transform block based on the second transform set. Here, the certain threshold value may be differently set based on at least one of the number of non-zero coefficients of the quantized second transform block, the sum of the squares of the non-zero coefficients, the depth, and the quantization parameter.

As another example, the image decoding apparatus 10 may not obtain the second transform set information, and may not inverse-transform the second transform block or may generate the first transform block by inverse-transforming the second transform block based on the second transform set, with respect to the second transform block of a 128×128 size.

When it is determined to obtain the second transform set information, the image decoding apparatus 10 may obtain the second transform set information from a bitstream.

The image decoding apparatus 10 may determine the second transform set information based on whether or not to obtain the second transform set information.

That is, the image decoding apparatus 10 may obtain information indicating whether or not to obtain the second transform set information, with respect to an upper unit of a current block. When the information indicating whether or not to obtain the second transform set information indicates to obtain the second transform set information, the image decoding apparatus 10 may obtain the second transform set information.

The second transform set information may include at least one of information indicating whether or not to perform second transform and second transform set selection information indicating the second transform set applied to the first transform block.

The second transform set information may include an index having a length of 1 bit indicating whether or not to perform a second transform and an additional index having a length of n bits indicating the second transform set.

For example, the second transform set information may include an additional index having a length of 2 bits indicating a second transform set from among a plurality of second transform set candidates. The index having the length of 2 bits may be used to designate any second transform set from among 4 second transform set candidates.

In another embodiment, the second transform set information may include an index having a length of n bits to indicate both whether or not to perform a second transform and the second transform set.

For example, the second transform set information may include an index having a length of 2 bits to indicate both whether or not to perform a second transform and the second transform set. The index having the length of 2 bits may be used to indicate whether or not to perform a second transform (00) or to indicate any one of 3 second transform sets (01, 10, 11).

A configuration method of the second transform set information may be determined based on at least one of a size, a shape, a prediction mode, a encoding tool, the number of non-zero coefficients, a sum of the squares of the non-zero coefficients, a depth, and a quantization parameter of a second transform block.

For example, the second transform set information with respect to a second transform block having a 64×64 size may include an index having a length of 1 bit indicating whether or not to perform a second transform and an additional index having a length of 1 bit indicating the second transform set.

On the other hand, the second transform set information with respect to a second transform block having a 64×16 size may include only an index having a length of 2 bits to indicate both whether or not to perform a second transform and the second transform set.

The second transform set selection information indicating the second transform set may be entropy-encoded and decoded based on any one of a context-based adaptive binary arithmetic coding (CABAC) method, a fixed length method, and a unary method.

In particular, according to the CABAC method, context modeling may be performed by using information about a second transform set of a peripheral block of a first transform block.

For example, when the unary binarization method is used, the image decoding apparatus 10 may assign each second transform set as 0, 10, 110, or 111.

As another example, when the CABAC method is used, the image decoding apparatus 10 may assign each second transform set candidate as 0, 10, 110, or 111 via the unary binarization method, and then may perform context modeling in which a probability of bin required for binary arithmetic coding is estimated.

As another example, when the fixed length encoding method is used, the image decoding apparatus 10 may assign each second transform set as 00, 01, 10, or 11. When the CABAC method is used, the image decoding apparatus 10 may perform context modeling by using the information about the second transform set of the peripheral block of the first transform block, that is, an index for indicating whether or not to perform a second transform on the peripheral block of the first transform block and indicating a second transform set applied to the peripheral block of the first transform block.

The entropy encoding method of the information indicating the second transform set may be determined based on at least one of a size, a shape, a prediction mode, a encoding tool, the number of non-zero coefficients, a sum of the squares of the non-zero coefficients, a depth, and a quantization parameter of a second transform block.

When the information indicating whether or not to perform a second transform, which is included in the second transform set information, indicates not to perform the second transform, the image decoding apparatus 10 may not obtain the information indicating the second transform set.

For example, when an index having a length of 1 bit indicating whether or not to perform a second transform with respect to a first transform block indicates not to perform the second transform, the image decoding apparatus 10 may not obtain an index having a length of 2 bits indicating a second transform set, thereby reducing the total number of parameters used for second transform to reduce overhead.

The image decoding apparatus 10 may select any one second transform set from among a plurality of second transform set candidates corresponding to a plurality of prediction modes, by using the obtained second transform set information.

Here, the plurality of prediction modes may include at least two intra prediction modes.

The second transform set may correspond to a predetermined angle for generating a first transform block by rotation-transforming the second transform block, wherein a plurality of transform matrices included in the second transform set may include a horizontal transform matrix and a vertical transform matrix for rotation transform.

The image decoding apparatus 10 may generate the first transform block by inverse-transforming the second transform block based on the plurality of transform matrices included in the selected second transform set.

According to an embodiment, the inverse transform with respect to the second transform block may be rotation transform. The second transform set used for the rotation transforming may correspond to a predetermined angle for generating the first transform block by rotation-transforming the second transform block. The second transform set used for the rotation transforming may include a horizontal transform matrix and a vertical transform matrix for rotation-transforming the second transform block.

A detailed method of performing rotation transform by using the horizontal transform matrix and the vertical transform matrix included in the second transform set will be described below with reference to FIG. 5.

The image decoding apparatus 10 may generate a first transform block by inverse-transforming at least a portion of a second transform block, wherein the second transform block may correspond to a coefficient block having a size of a ratio of 1:N or N:1.

Here, the coefficient block having the size of the ratio of 1:N may include coefficient blocks having sizes of 4×8, 8×16, 16×32, 32×64, 4×16, 8×32, 16×64, 4×32, 8×64, and 4×64 and the coefficient block having the size of the ratio of N:1 may include coefficient blocks having sizes of 8×4, 16×8, 32×16, 64×32, 16×4, 32×8, 64×16, 32×4, 64×8, and 64×4.

The image decoding apparatus 10 may inverse-rearrange a coefficient of the first transform block by inverse-transforming the second transform block, by using a transform matrix selected from the second transform set corresponding to any one rearrangement angle from among a plurality of predetermined rearrangement angles.

For example, the image decoding apparatus 10 may inverse-rearrange the coefficient of the first transform block by inverse-transforming the second transform block, by using the transform matrix included in the second transform set corresponding to any one rearrangement angle from among predetermined 90 degrees, 180 degrees, and 270 degrees.

A detailed method, performed by the image decoding apparatus 10, of generating the first transform block by inverse-transforming the second transform block based on the plurality of transform matrices included in the second transform set will be described below with reference to FIG. 6.

Figure 2:
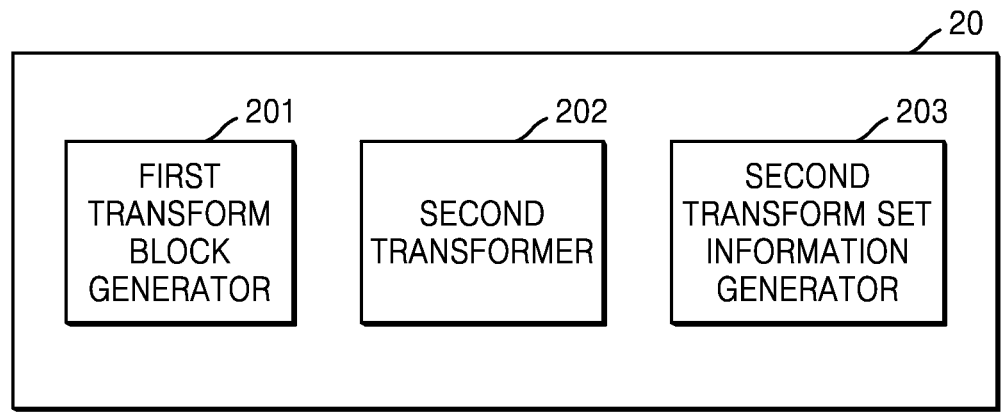
FIG. 2 is a block diagram of an image encoding apparatus according to an embodiment.

FIG. 2 is a block diagram of an image encoding apparatus 20 according to an embodiment.

The image encoding apparatus 20 may include a first transform block generator 201, a second transformer 202, and a second transform set information generator 203. Alternatively, the first transform block generator 201, the second transformer 202, and the second transform set information generator 203 may correspond to one processor, or a plurality of processors interactively operating with each other.

The image encoding apparatus 20 may generate a first transform block by transforming a residual block based on a first transform matrix.

The image encoding apparatus 20 may select any one second transform set applied to the first transform block from among a plurality of second transform set candidates corresponding to a plurality of prediction modes.

The image encoding apparatus 20 may generate a second transform block by transforming the first transform block based on a plurality of transform matrices included in the selected second transform set.

According to an embodiment, transform with respect to the first transform block may be rotation transform and the second transform set used for the rotation transforming may correspond to a predetermined angle for rotation-transforming the first transform block. The second transform set used for the rotation transforming may include a horizontal transform matrix and a vertical transform matrix for rotation-transforming the first transform block.

Second transform set selection information indicating the second transform set may be entropy-encoded based on any one of a CABAC method, a fixed length method, and a unary method.

In particular, according to the CABAC method, context modeling may be performed by using information about a second transform set of a peripheral block of the first transform block For example, when the unary binarization method is used, the image encoding apparatus 20 may transform the information indicating the second transform set applied to the first transform block into bin-strings, such as 0, 10, 110, and 111.

As another example, when the CABABC method is used, the image encoding apparatus 20 may transform the information indicating the second transform set applied to the first transform block into the bin-strings, such as 0, 10, 110, and 111, via the unary binarization encoding method, and then may perform context modeling, in which a probability of bin required for binary arithmetic encoding is estimated.

As another example, when the fixed length encoding method is used, the image encoding apparatus 20 may transform the information indicating the second transform set applied to the first transform block into bin-strings having a fixed length of 2 bits, such as 00, 01, 10, and 11.

When the CABAC method is used, the image encoding apparatus 20 may perform context modeling by using the information about the second transform set of the peripheral block of the first transform block, that is, an index for indicating whether or not to perform a second transform on the peripheral block of the first transform block and indicating a second transform set applied to the peripheral block of the first transform block, from among the plurality of second transform set candidates.

The entropy encoding method of the information indicating the second transform set applied to the first transform block may be determined based on at least one of a size, a shape, a prediction mode, a encoding tool, the number of non-zero coefficients, a sum of the squares of the non-zero coefficients, a depth, and a quantization parameter of a second transform block.

The image encoding apparatus 20 may rearrange a coefficient of the second transform block by transforming the first transform block, by using a transform matrix selected from the second transform set corresponding to any one rearrangement angle from among a plurality of predetermined rearrangement angles.

The image encoding apparatus 20 may generate second transform set information including at least one of information about whether or not to perform a second transform with respect to the first transform block and information indicating the second transform set applied to the first transform block.

Figure 3:
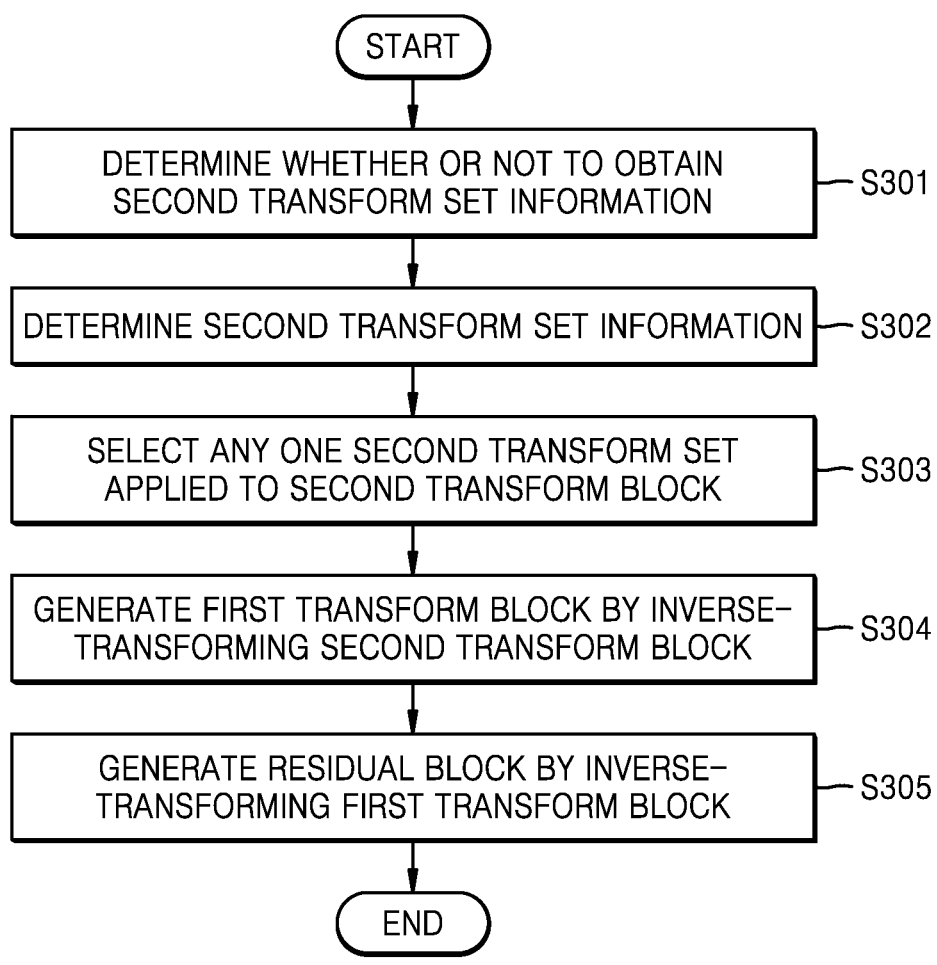
FIG. 3 is a flowchart of a process, performed by an image decoding apparatus, of performing an inverse second transform, according to an embodiment.

FIG. 3 is a flowchart of a process, performed by the image decoding apparatus 10, of performing inverse-second transform, according to an embodiment.

In operation S301, the image decoding apparatus 10 may determine whether or not to obtain second transform set information.

When it is determined not to obtain the second transform set information, the image decoding apparatus 10 may not inverse-transform a second transform block or may generate a first transform block by inverse-transforming the second transform block based on a second transform set.

On the other hand, when it is determined to obtain the second transform set information, the image decoding apparatus 10 may obtain the second transform set information from a bitstream.

In operation S302, the image decoding apparatus 10 may determine the second transform set information based on whether or not to obtain the second transform set information.

That is, the image decoding apparatus 10 may obtain information indicating whether or not to obtain the second transform set information, with respect to an upper unit of a current block. When the information indicating whether or not to obtain the second transform set information indicates to obtain the second transform set information, the image decoding apparatus 10 may obtain the second transform set information.

The second transform set information may include at least one of information about whether or not to perform a second transform and second transform set selection information indicating a second transform set applied to the first transform block.

When the information about whether or not to perform a second transform, which is included in the second transform set information, indicates not to perform the second transform, the image decoding apparatus 10 may not obtain the second transform set selection information indicating the second transform set.

In operation S303, the image decoding apparatus 10 may select any one second transform set from among a plurality of second transform set candidates corresponding to a plurality of prediction modes, by using the second transform set information.

The second transform set may correspond to a predetermined angle for generating the second transform block by rotation-transforming the first transform block, wherein a plurality of transform matrices included in the second transform set may include a horizontal transform matrix and a vertical transform matrix for rotation-transform.

In operation S304, the image decoding apparatus 10 may generate the first transform block by inverse-transforming the second transform block based on the plurality of transform matrices included in the selected second transform set.

The inverse-transform with respect to the second transform block may be rotation-transform, and the second transform set used for the rotation-transform may correspond to a predetermined angle for generating the first transform block by rotation-transforming the second transform block. Here, the second transform set used for the rotation-transform may include a horizontal transform matrix and a vertical transform matrix for generating the first transform block by rotation-transforming the second transform block.

The image decoding apparatus 10 may inverse-rearrange a coefficient of the first transform block by inverse-transforming the second transform block, by using a transform matrix selected from the second transform set corresponding to any one of a plurality of predetermined rearrangement angles.

In operation S305, the image decoding apparatus 10 may generate the residual block corresponding to the first transform block by inverse-transforming the first transform block based on a first transform matrix.

Figure 4:
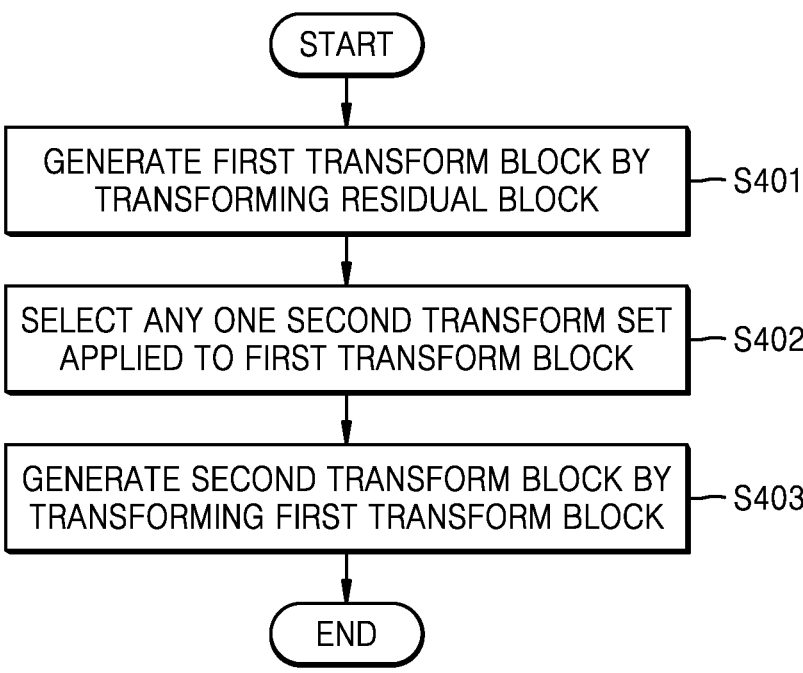
FIG. 4 is a flowchart of a process, performed by an image encoding apparatus, of performing a second transform, according to an embodiment.

FIG. 4 is a flowchart of a process, performed by the image encoding apparatus 20, of performing a second transform, according to an embodiment.

In operation S401, the image encoding apparatus 20 may generate a first transform block by transforming a residual block based on a first transform matrix.

In operation S02, the image encoding apparatus 20 may select any one second transform set applied to the first transform block from among a plurality of second transform set candidates corresponding to a plurality of prediction modes.

In operation S403, the image encoding apparatus 20 may generate a second transform block by transforming the first transform block based on a plurality of transform matrices included in the selected second transform set.

Figure 5:
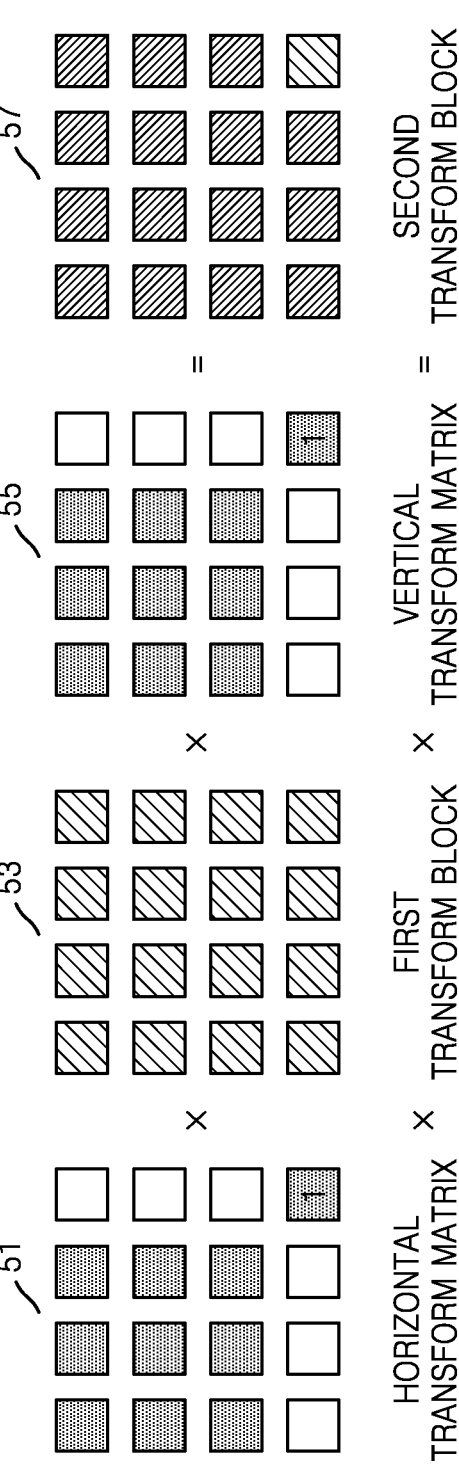
FIG. 5 illustrates a method of performing a second transform by using a horizontal transform matrix and a vertical transform matrix included in a second transform set, according to an embodiment.

FIG. 5 illustrates a method of performing a second transform by using a horizontal transform matrix and a vertical transform matrix included in a second transform set, according to an embodiment.

Referring to FIG. 5, the plurality of transform matrices included in the second transform set may include a horizontal transform matrix 51 and a vertical transform matrix 55 for transforming a first transform block 53.

In more detail, the second transform with respect to the first transform block 53 may be rotation transform. Here, the second transform set may correspond to a predetermined angle for generating a second transform block 57 by rotation-transforming the first transform block 53, wherein the plurality of transform matrices included in the second transform set may include the horizontal transform matrix 51 and the vertical transform matrix 55 for rotation-transform.

Substantially, the horizontal transform matrix 51 may include angle parameters for performing partial transform among rows of coefficients included in the first transform block 53 and the vertical transform matrix 55 may include angle parameters for performing partial transform among columns of the coefficients included in the first transform block 53.

That is, the horizontal transform matrix 51 and the vertical transform matrix 55 may include a combination of angle parameters for rotation-transforming the first transform block 53 at a certain angle.

Thus, the plurality of parameters included in a certain second transform set may be differently set for each certain second transform set to correspond to a certain angle for generating the second transform block 57.

The horizontal transform matrix 51 and the vertical transform matrix 55 included in the second transform set may be used to perform a second transform only in a specific direction based on a size and a shape of the first transform block or to additionally perform a second transform in the specific direction.

For example, with respect to a first transform block having any specific size and shape, the second transform may be performed based on only the horizontal transform matrix 51, or the second transform may be additionally performed based on only the horizontal transform matrix 51 after the second transform is performed based on the horizontal transform matrix 51 and the vertical transform matrix 55.

A relationship between the angle for rotation-transforming the first transform block 53 and the second transform set will be described below with reference to FIG. 7.

Figure 6:
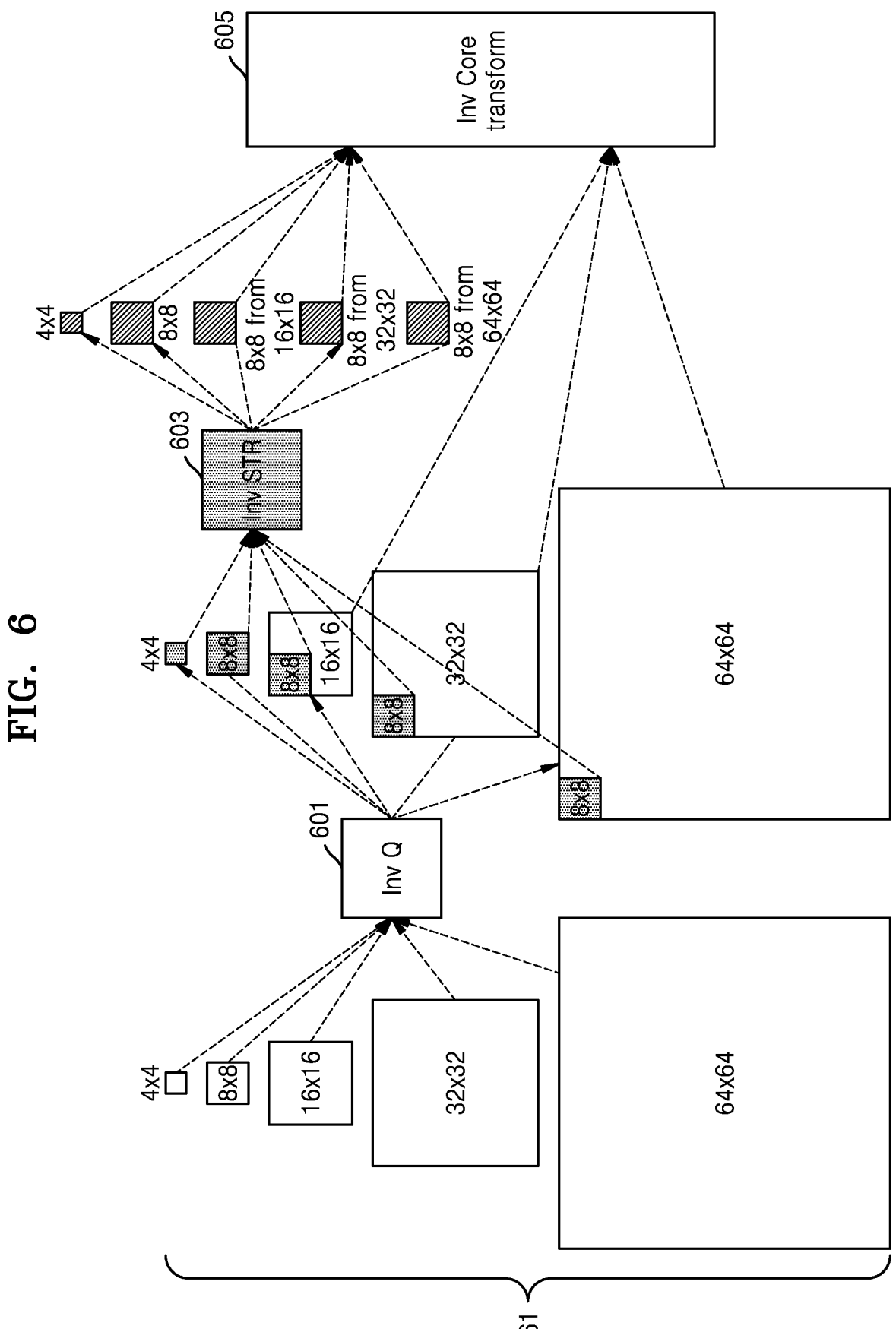
FIG. 6 illustrates a process, performed by an image decoding apparatus, of applying an inverse second transform, according to an embodiment.

FIG. 6 illustrates a process, performed by the image decoding apparatus 10 of applying an inverse second transform, according to an embodiment.

Referring to FIG. 6, the image decoding apparatus 10 may perform inverse-quantization (Inv Q) 601 with respect to a second transform block 61 which has a size of 4×4 to 64×64 and is quantized, to generate a second transform block.

Also, the image decoding apparatus 10 may generate a first transform block by performing inverse-transform (Inv STR) 603 on the second transform block generated via the Inv Q 601.

Lastly, the image decoding apparatus 10 may perform inverse-transform (Inv Core transform) 605 on the first transform block based on a first transform matrix in order to transform the first transform block into residual blocks.

The image decoding apparatus 10 may determine a method of performing the Inv STR 603 on the second transform block, based on at least one of a size, a shape, a prediction mode, a encoding tool, the number of non-zero coefficients, a sum of the squares of the non-zero coefficients, a depth, and a quantization parameter of the second transform block.

Generally, even when a compression rate is improved via inverse-transform with respect to the second transform block, the total amount of data is not reduced when the number of parameters for the inverse-transform is increased, thereby increasing overhead.

Thus, in order to fully have the effect of inverse-transform with respect to the second transform block having a large size, coefficients included in a selected sampling block have to be coefficients affecting compression of image data. Thus, the image decoding apparatus 10 may perform inverse-transform by selecting only coefficients with respect to a low frequency component having a high probability of having a value that is not "0," in order to increase the compression efficiency.

That is, frequency coefficients with respect to a low frequency component may be included at a top left portion in a general frequency coefficient block generated by DCT, and thus the image decoding apparatus 10 may use coefficient sampling to inverse-transform the second transform block having a size equal to or greater than a predetermined size.

The image decoding apparatus 10 may generate the first transform block by inverse-transforming at least a portion of the second transform block having an N×N size. Here, the image decoding apparatus 10 may perform inverse transform by selecting, as a sampling block, only coefficients located at a top left portion of the second transform block.

For example, as illustrated in FIG. 6, the image decoding apparatus 10 may select a 8×8 sized sampling block including only some coefficients of the second transform block having a 16×16 size or a size greater than the 16×16 size, and then may perform inverse-transform 603 on the selected sampling block. Here, the image decoding apparatus 10 may not perform inverse-transform 603 with respect to a remaining portion of the second transform block.

The image decoding apparatus 10 may generate the first transform block by inverse-transforming at least a portion of a second transform block having a size of a ratio of 1:N or N:1.

For example, the image decoding apparatus 10 may perform inverse-transform by selecting a sampling block having any one of 4×8, 4×16, and 4×32 sizes, with respect to the second transform block having the size of the ratio of 1:N.

In more detail, with respect to the second transform blocks having 4×8, 4×16, 4×32, and 4×64 sizes, inverse-transform may be performed on only a left sampling block having a 4×4 size, and with respect to the second transform blocks having 8×16, 8×32, and 8×64 sizes, inverse-transform may be performed on only a top left sampling block having a 4×4 size or a left sampling block having a 8×8 size. Alternatively, with respect to the second transform block having 8×16, 8×32, and 8×64 sizes, inverse-transform may be performed on only top left sampling blocks having 4×8, 4×16, and 4×32 sizes, respectively.

With respect to the second transform block having the size of the ratio of N:1, inverse-transform may be performed by selecting a sampling block having any one of 8×4, 16×4, and 32×4 sizes.

In more detail, with respect to the second transform blocks having 8×4, 16×4, 32×4, and 64×4 sizes, inverse-transform may be performed on only a top sampling block having a 4×4 size, and with respect to the second transform blocks having 16×8, 32×8, and 64×8 sizes, inverse-transform may be performed on only a top left sampling block having a 4×4 size or a top sampling block having a 8×8 size. Alternatively, with respect to the second transform block having 16×8, 32×8, and 64×8 sizes, inverse-transform may be performed on only top left sampling blocks having 8×4, 16×4, and 32×4 sizes, respectively.

Here, the image decoding apparatus 10 may not perform inverse-transform 603 with respect to a remaining portion of the second transform block.

When the image decoding apparatus 10 inverse-transforms the second transform block having a predetermined size or a size greater than the predetermined size, the image decoding apparatus 10 may split the second transform block into a plurality of sub-blocks and inverse-transform all of the sub-blocks to generate the first transform block.

For example, the image decoding apparatus 10 may split the second transform block having a 16×16 size or a size greater than the 16×16 size into the sub-blocks having a 8×8 size and may perform inverse transform on all of the sub-blocks.

The image decoding apparatus 10 may determine a portion of a quantized second transform block, to which inverse transform is to be applied, based on the number of non-zero coefficients of the quantized second transform block.

For example, the image decoding apparatus 10 may select a sampling block having a 4×4 size or a 8×8 size and perform inverse-transform on the selected sampling block, when non-zero coefficients included in the quantized second transform block are equal to or greater than a predetermined threshold value.

Figure 7:
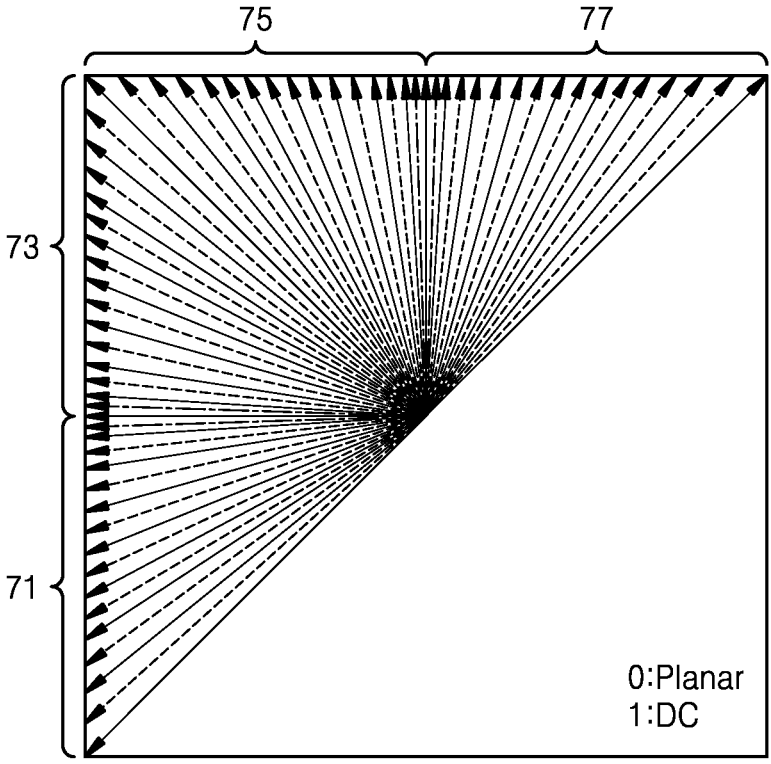
FIG. 7 illustrates an example of transform angles corresponding to a plurality of intra prediction modes (IPMs), according to an embodiment.

FIG. 7 illustrates an example of angles corresponding to a plurality of intra prediction modes (IPM), according to an embodiment.

FIG. 7 illustrates angles corresponding to the plurality of IPMs and the angles are divided into four angle groups for convenience of explanation. Here, first through sixteenth angles may be referred to as a first horizontal angle 71, seventeenth through thirty-second angles may be referred to as a second horizontal angle 73, thirty third through forty eighth angles may be referred to as a first vertical angle 75, and forty ninth through sixty fourth angles may be referred to as a second vertical angle 77.

When the image encoding apparatus 20 rotation-transforms a first transform block based on the angles corresponding to the plurality of IPMs, a specific angle group including at least one of the angles corresponding to the plurality of IPMs may correspond to any one second transform set.

For example, the first through thirty second angles included in the first horizontal angle 71 and the second horizontal angle 73, from among the first through sixty fourth angles corresponding to the sixty four IPMs (except a 0: planar mode and 1: DC mode of sixty six IPMs), may be set to correspond to any one second transform set included in a plurality of second transform set candidates.

Here, when the image encoding apparatus 20 rotation-transforms the first transform block based on any one of the first through thirty second angles included in the first horizontal angle 71 and the second horizontal angle 73, the first transform block may be rotation-transformed by using a horizontal transform matrix and a vertical transform matrix included in a specific second transform set corresponding to the first horizontal angle 71 and the second horizontal angle 73.

The first through sixty fourth angles may be used to construct the 2 n second transform set candidates. Here, second transform set information may include information indicating a second transform set applied to the first transform block from among the 2 n second transform set candidates. For example, the information indicating the second transform set applied to the first transform block from among the 2 n second transform set candidates may be an index having a length of n bits.

The plurality of second transform set candidates may correspond to the plurality of IPMs, respectively. Here, the prediction mode may include a plurality of IPMs with respect to the first transform block.

For example, the plurality of second transform set candidates may be differently set based on the IPMs of the first transform block. When four second transform sets, which are set 1, set 2, and set 3, and set 4, are set as the plurality of second transform set candidates, with respect to IPM 0, other four second transform sets, which are set 5, set 6, set 7, and set 8, may be set as the plurality of second transform set candidates, with respect to IPM 1.

As another example, the plurality of IPMs corresponding to the plurality of second transform set candidates may include at least two IPMs from among the plurality of IPMs with respect to the first transform block. When four second transform sets, which are set 1, set 2, and set 3, and set 4, are set as the plurality of second transform set candidates, with respect to IPM 0, the same four second transform sets, which are set 1, set 2, set 3, and set 4, may be set as the plurality of second transform set candidates, with respect to IPMs 1, 2, and 3.

That is, when the second transform set is set based on the IPM of the first transform block, the same plurality of second transform set candidates may be used for the plurality of IPMs, thereby reducing the total number of predetermined second transform sets, and overhead may be reduced because the total number of parameters used for second transform is reduced.

As another example, the plurality of second transform set candidates may be differently set based on an inter prediction mode of the first transform block. When four second transform sets, which are set 1, set 2, set 3, and set 4, are set as the plurality of second transform set candidates, with respect to an affine motion prediction mode, from among the inter prediction modes, other four second transform sets, which are set 5, set 6, set 7, and set 8, may be set as the plurality of second transform set candidates, with respect to an advanced motion vector prediction (AMVP) mode, from among the inter prediction modes.

As another example, the plurality of second transform sets may be differently set based on a size and a shape (that is, a ratio of a width to a height of the first transform block) of the first transform block. When four second transform sets, which are set 1, set 2, set 3, and set 4, are set as the plurality of second transform set candidates, with respect to a square first transform block having a size of a ratio of 1:1, other four second transform sets, which are set 5, set 6, set 7, and set 8, may be set as the plurality of second transform set candidates, with respect to a rectangular first transform block having a size of a ratio of 1:2.

The second transform sets may be set for a default mode for inverse-transforming the second transform block based on any one second transform set included in basic second transform sets predetermined when it is determined not to obtain second transform set information. Here, a second transform set in a default mode predetermined via a syntax element parsed in a video slice level may be used.

Hereinafter, splitting of a coding unit will be described in detail according to an embodiment of the disclosure.

An image may be split into a largest coding unit. A size of the largest coding unit may be determined based on information obtained from a bitstream. A shape of the largest coding unit may be a same-sized square. However, it is not limited thereto. Also, the largest coding unit may be hierarchically split into a coding unit based on split shape mode information obtained from the bitstream. The split shape mode information may include at least one of information indicating whether or not to perform splitting, split direction information, and split type information. The information indicating whether or not to perform splitting may indicate whether or not to split a coding unit. The split direction information may indicate to split in a horizontal direction or a vertical direction. The split type information may indicate to split the coding unit based on any one of binary split, tri split, and quad split.

For example, the split shape mode information (split-_mode) may indicate not to split (NO_SPLIT) a current coding unit. Also, the split shape mode information may indicate quad split (QUAD_SPLIT). Also, the split shape mode information may indicate binary vertical split (BI_VER_SPLIT). Also, the split shape mode information may indicate binary vertical split (BI_VER_SPLIT). Also, the split shape mode information may indicate binary horizontal split (BI_HOR_SPLIT). Also, the split shape mode information may indicate tri vertical split (TRI_VER-_SPLIT). Also, the split shape mode information may indicate tri horizontal split (TRI_HOR_SPLIT).

A image decoding apparatus may obtain the split shape mode information from a bitstream, from one bin-string. The form of the bitstream received by the image decoding apparatus may include a fixed length binary code, a unary code, a truncated unary code, a predetermined binary code, etc. The bin-string may indicate information in an array of binary numbers. The bin-string may include at least one bit. The image decoding apparatus may obtain the split shape mode information corresponding to the bin-string based on a split rule. The image decoding apparatus may determine whether or not to split the coding unit, a split direction, and a split type based on at least one bin-string.

The coding unit may be smaller than or the same as a largest coding unit. For example, when the split shape mode information indicates not to split the coding unit, the coding unit may have the same size as the largest coding unit. When the split shape mode information indicates to split the coding unit, the largest coding unit may be split into the coding units. Also, when the split shape mode information with respect to the coding unit indicates to split the coding unit, the coding units may be split into smaller coding units. However, splitting of the image is not limited thereto, and the largest coding unit and the coding unit may not be different from each other. Splitting of the coding unit will be described in more detail with reference to FIGS. 8 through 21.

Also, the coding unit may be split into a prediction unit for image prediction. The prediction unit may be the same as or smaller than the coding unit. Also, the coding unit may be split into a transform unit for image transform. The transform unit may be the same as or smaller than the coding unit. The shape and the size of the transform unit and the prediction unit may not be related to each other. The coding unit may be different from the prediction unit and the transform unit, or the coding unit, the prediction unit, and the transform unit may be the same as one another. Splitting of the prediction unit and the transform unit may be performed by the same method as splitting of the coding unit. Splitting of the coding unit will be described in more detail with reference to FIGS. 8 through 21. A current block and a peripheral block of the disclosure may indicate any one of the largest coding unit, the coding unit, the prediction unit, and the transform unit. Also, the current block or the current coding unit may be a block on which decoding or encoding is currently performed or a block on which splitting is currently performed. The peripheral block may be a block reconstructed previously to the current block. The peripheral block may be adjacent to the current block spatially or temporally. The peripheral block may be located at any one of a lower left portion, a left portion, a top left portion, a top portion, a top right portion, a right portion, and a lower right portion of the current block.

Figure 8:
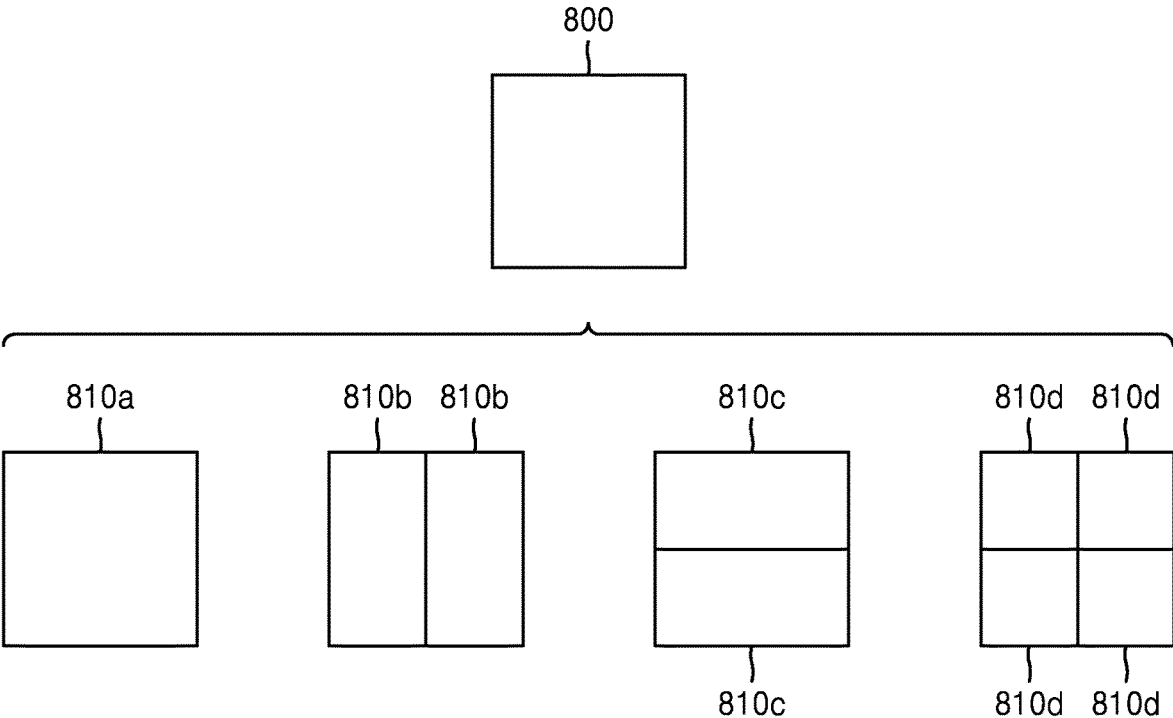
FIG. 8 illustrates a process of determining at least one coding unit by splitting a current coding unit, according to an embodiment.

FIG. 8 illustrates a process, performed by an image decoding apparatus, of determining at least one coding unit by splitting a current coding unit, according to an embodiment.

A block shape may include 4N×4N, 4N×2N, 2N×4N, 4N×N, or N×4N. Here, N may be a positive integer. The block shape information may be information indicating at least one of a shape, a direction, a ratio of a width to a height, and a size of a coding unit.

The shape of the coding unit may include a square shape and a non-square shape. When the width and the height of the coding unit are the same (that is, when the block shape of the coding unit is 4N×4N), the image decoding apparatus may determine the block shape information of the coding unit as a square. The image decoding apparatus may determine the shape of the coding unit as a non-square.

When the width and the height of the coding unit are different from each other (that is, when the block shape of the coding unit is 4N×2N, 2N×4N, 4N×N, or N×4N), the image decoding apparatus may determine the block shape information of the coding unit as a non-square. When the shape of the coding unit is a non-square, the image decoding apparatus may determine the ratio of the width to the height, from the block shape information of the coding unit, as at least one of 1:2, 2:1, 1:4, 4:1, 1:8, and 8:1. Also, the image decoding apparatus may determine whether the coding unit is a horizontal direction or a vertical direction, based on the width and the height of the coding unit. Also, the image decoding apparatus may determine the size of the coding unit based on at least one of the width, the height, and an area of the coding unit.

According to an embodiment, the image decoding apparatus may determine a shape of a coding unit by using block shape information, and may determine a splitting method of the coding unit by using split shape mode information. That is, a coding unit splitting method indicated by the split shape mode information may be determined based on a block shape indicated by the block shape information used by the image decoding apparatus.

The image decoding apparatus may obtain the split shape mode information from a bitstream. However, it is not limited thereto. The image decoding apparatus and the image encoding apparatus 20 may determine predetermined split shape mode information based on the block shape information. The image decoding apparatus may determine predetermined split shape mode information with respect to a largest coding unit or a smallest coding unit. For example, the image decoding apparatus may determine the split shape mode information with respect to the largest coding unit as quad split. Also, the image decoding apparatus may determine the split shape mode information with respect to the smallest coding unit as "not to be split." In detail, the image decoding apparatus may determine a size of the largest coding unit as 256×256. The image decoding apparatus may determine the predetermined split shape mode information as quad split. Quad split is a split shape mode in which both a width and a height of a coding unit are bisected. The image decoding apparatus may obtain a coding unit of a 128×128 size from a largest coding unit of a 256×256 size based on the split shape mode information. Also, the image decoding apparatus may determine a size of the smallest coding unit as 4×4. The image decoding apparatus may obtain the split shape mode information indicating "not to perform splitting" with respect to the smallest coding unit.

According to an embodiment, the image decoding apparatus may use the block shape information indicating that the current coding unit has a square shape. For example, the image decoding apparatus may determine whether not to split a square coding unit, whether to vertically split the square coding unit, whether to horizontally split the square coding unit, or whether to split the square coding unit into four coding units, based on the split shape mode information. Referring to FIG. 8, when the block shape information of a current coding unit 800 indicates a square shape, a decoder may determine that a coding unit 810a having the same size as the current coding unit 800 is not split, based on the split shape mode information indicating not to perform splitting, or may determine coding units 810b, 810c, or 810d split based on the split shape mode information indicating a predetermined splitting method.

Referring to FIG. 8, according to an embodiment, the image decoding apparatus may determine two coding units 810b obtained by splitting the current coding unit 800 in a vertical direction, based on the split shape mode information indicating to perform splitting in a vertical direction. The image decoding apparatus may determine two coding units 810c obtained by splitting the current coding unit 800 in a horizontal direction, based on the split shape mode information indicating to perform splitting in a horizontal direction. The image decoding apparatus may determine four coding units obtained by splitting the current coding unit 800 in vertical and horizontal directions, based on the split shape mode information indicating to perform splitting in vertical and horizontal directions. However, splitting methods of the square coding unit are not limited to the above-described methods, and the split shape mode information may indicate various methods. Predetermined splitting methods of splitting the square coding unit will be described in detail below in relation to various embodiments.

Figure 9:
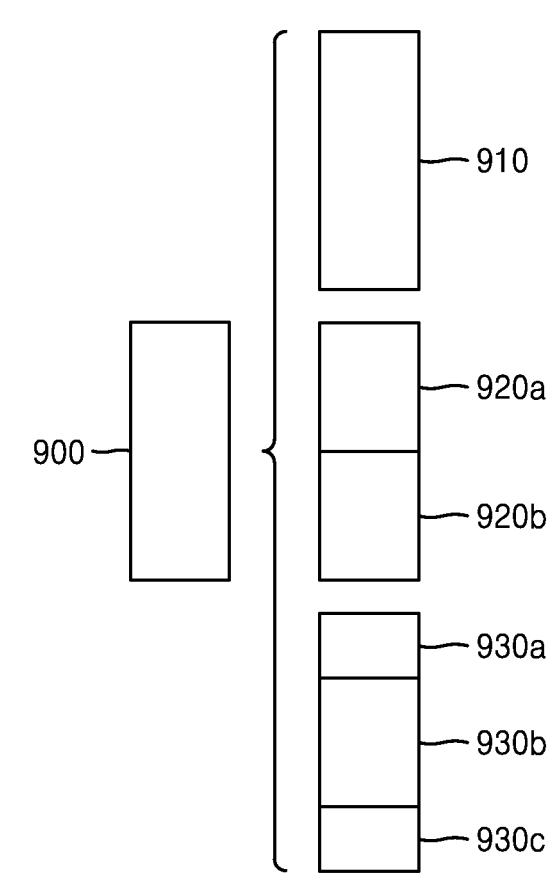
FIG. 9 illustrates a process of determining at least one coding unit by splitting a non-square coding unit, according to an embodiment.
Figure 9:
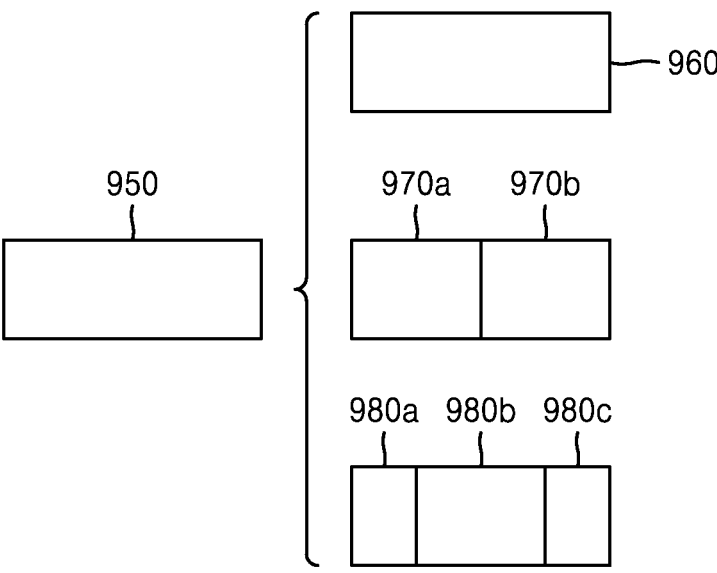

FIG. 9 illustrates a process, performed by the image decoding apparatus, of determining at least one coding unit by splitting a non-square coding unit, according to an embodiment.

According to an embodiment, the image decoding apparatus may use block shape information indicating that a current coding unit has a non-square shape. The image decoding apparatus may determine whether not to split the non-square current coding unit or whether to split the non-square current coding unit by using a predetermined splitting method, based on split shape mode information. Referring to FIG. 9, when the block shape information of a current coding unit 900 or 950 indicates a non-square shape, the image decoding apparatus may determine a coding unit 910 or 960 having the same size as the current coding unit 900 or 950, based on the split shape mode information indicating not to perform splitting, or determine coding units 920a and 920b, 930a to 930c, 970a and 970b, or 980a to 980c split based on the split shape mode information indicating a predetermined splitting method. Predetermined splitting methods of splitting a non-square coding unit will be described in detail below in relation to various embodiments.

According to an embodiment, the image decoding apparatus may determine a splitting method of a coding unit by using the split shape mode information and, in this case, the split shape mode information may indicate the number of one or more coding units generated by splitting a coding unit. Referring to FIG. 9, when the split shape mode information indicates to split the current coding unit 900 or 950 into two coding units, the image decoding apparatus may determine two coding units 920a and 920b, or 970a and 970b included in the current coding unit 900 or 950, by splitting the current coding unit 900 or 950 based on the split shape mode information.

According to an embodiment, when the image decoding apparatus splits the non-square current coding unit 900 or 950 based on the split shape mode information, the location of a long side of the non-square current coding unit 900 or 950 may be considered. For example, the image decoding apparatus may determine a plurality of coding units by dividing a long side of the current coding unit 900 or 950, in consideration of the shape of the current coding unit 900 or 950.

According to an embodiment, the split shape mode information indicates to tri-split a coding unit into an odd number of blocks, the image decoding apparatus may determine an odd number of coding units included in the current coding unit 900 or 950. For example, when the split shape mode information indicates to split the current coding unit 900 or 950 into three coding units, the image decoding apparatus may split the current coding unit 900 or 950 into three coding units 930a, 930b, and 930c, or 980a, 980b, and 980c.

According to an embodiment, a ratio of a width to a height of the current coding unit 900 or 950 may be 4:1 or 1:4. When the ratio of the width to the height is 4:1, the width is greater than the height, and thus, the block shape information may be a horizontal direction. When the ratio of the width to the height is 1:4, the width is smaller than the height, and thus, the block shape information may be a vertical direction. The image decoding apparatus may determine to split the current coding unit into an odd number of blocks based on the split shape mode information. Also, the image decoding apparatus may determine a split direction of the current coding unit 900 or 950 based on the block shape information of the current coding unit 900 or 950. For example, when the current coding unit 900 is a vertical direction, the image decoding apparatus may split the current coding unit 900 in a horizontal direction to determine coding units 930a, 930b, and 930c. Also, when the current coding unit 950 is a horizontal direction, the image decoding apparatus may split the current coding unit 950 in a vertical direction to determine coding units 980a, 980b, and 980c.

According to an embodiment, the image decoding apparatus may determine an odd number of coding units included in the current coding unit 900 or 950, and not all the determined coding units may have the same size. For example, a predetermined coding unit 930b or 980b from among the determined odd number of coding units 930a, 930b, and 930c, or 980a, 980b, and 980c may have a size different from the size of the other coding units 930a and 930c, or 980a and 980c. That is, coding units which may be determined by splitting the current coding unit 900 or 950 may have multiple sizes, and in some cases, all of the odd number of coding units 930a, 930b, and 930c, or 980a, 980b, and 980c may have different sizes.

According to an embodiment, when the split shape mode information indicates to split a coding unit into an odd number of blocks, the image decoding apparatus may determine an odd number of coding units included in the current coding unit 900 or 950, and may put a predetermined restriction on at least one coding unit from among the odd number of coding units generated by splitting the current coding unit 900 or 950. Referring to FIG. 9, the image decoding apparatus may allow a decoding method of the coding unit 930b or 980b to be different from that of the other coding units 930a and 930c, or 980a and 980c, wherein the coding unit 930b or 980b is at a center location from among the three coding units 930a, 930b, and 930c, or 980a, 980b, and 980c generated by splitting the current coding unit 900 or 950. For example, the image decoding apparatus may restrict the coding unit 930b or 980b at the center location to be no longer split or to be split only a predetermined number of times, unlike the other coding units 930a and 930c, or 980a and 980c.

Figure 10:
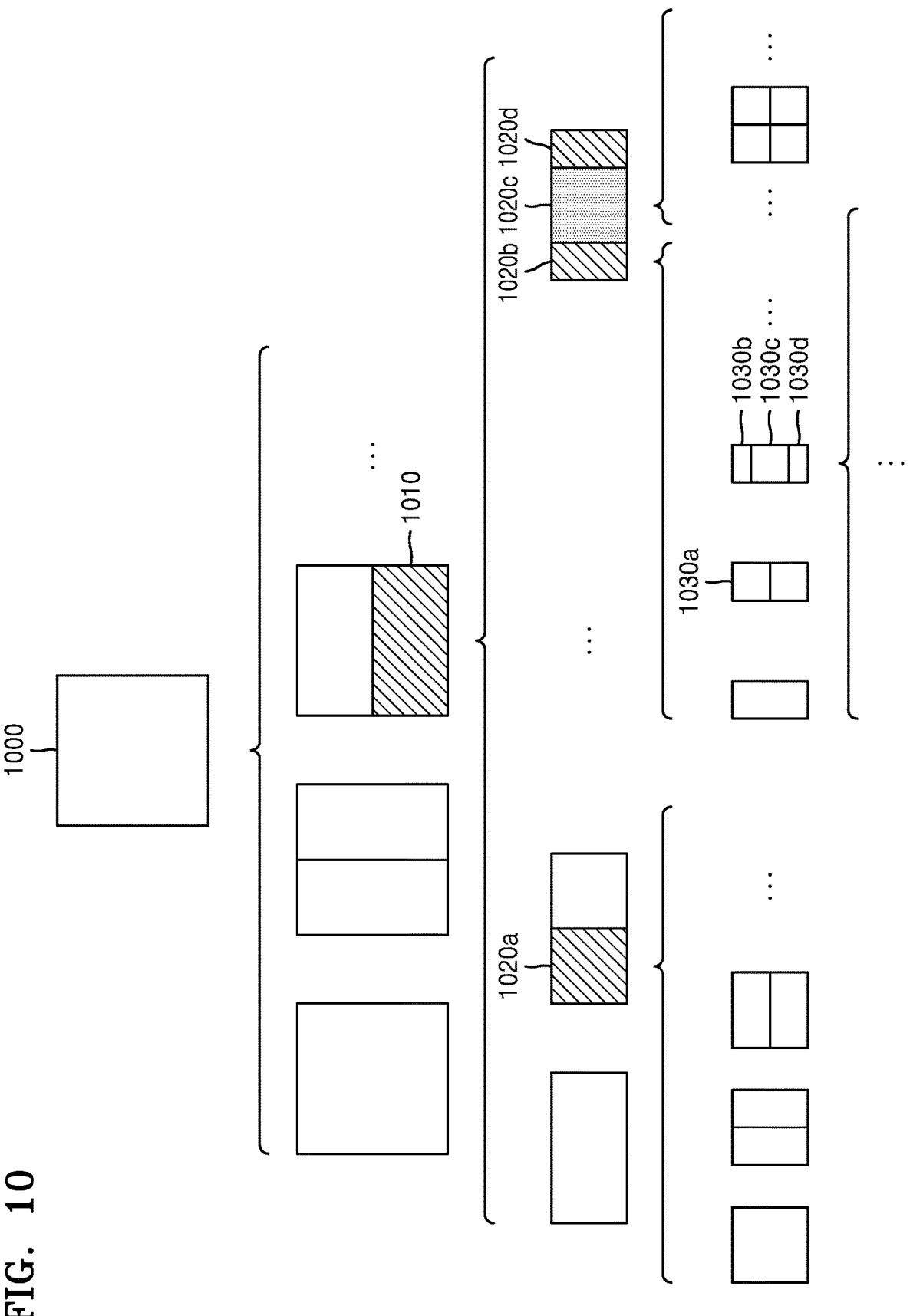
FIG. 10 illustrates a process of splitting a coding unit based on at least one of block shape information and split shape mode information, according to an embodiment.

FIG. 10 illustrates a process, performed by the image decoding apparatus, of splitting a coding unit based on at least one of block shape information and split shape mode information, according to an embodiment.

According to an embodiment, the image decoding apparatus may determine to split or not to split a square first coding unit 1000 into coding units, based on at least one of the block shape information and the split shape mode information. According to an embodiment, when the split shape mode information indicates to split the first coding unit 1000 in a horizontal direction, the image decoding apparatus may determine a second coding unit 1010 by splitting the first coding unit 1000 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus may determine to split or not to split the determined second coding unit 1010 into coding units, based on at least one of the block shape information and the split shape mode information. Referring to FIG. 10, the image decoding apparatus may or may not split the non-square second coding unit 1010, which is determined by splitting the first coding unit 1000, into one or more third coding units 1020a, or 1020b, 1020c, and 1020d based on at least one of the block shape information and the split shape mode information. The image decoding apparatus may obtain at least one of the block shape information and the split shape mode information, and determine a plurality of various-shaped second coding units (e.g., 1010) by splitting the first coding unit 1000, based on the obtained at least one of the block shape information and the split shape mode information, and the second coding unit 1010 may be split by using the splitting method of the first coding unit 1000, based on at least one of the block shape information and the split shape mode information. According to an embodiment, when the first coding unit 1000 is split into the second coding units 1010 based on at least one of the block shape information and the split shape mode information of the first coding unit 1000, the second coding unit 1010 may also be split into the third coding units 1020a, or 1020b, 1020c, and 1020d based on at least one of the block shape information and the split shape mode information of the second coding unit 1010. That is, a coding unit may be recursively split based on at least one of the block shape information and the split shape mode information of each coding unit. Therefore, a square coding unit may be determined by splitting a non-square coding unit, and a non-square coding unit may be determined by recursively splitting the square coding unit.

Referring to FIG. 10, a predetermined coding unit from among an odd number of third coding units 1020b, 1020c, and 1020d determined by splitting the non-square second coding unit 1010 (e.g., a coding unit at a center location or a square coding unit) may be recursively split. According to an embodiment, the square third coding unit 1020b from among the odd number of third coding units 1020b, 1020c, and 1020d may be split in a horizontal direction into a plurality of fourth coding units. A non-square fourth coding unit 1030b or 1030d from among the plurality of fourth coding units 1030a, 1030b, 1030c, and 1030d may be split into a plurality of coding units. For example, the non-square fourth coding unit 1030b or 1030d may be split into an odd number of coding units. A method that may be used to recursively split a coding unit will be described below in relation to various embodiments.

According to an embodiment, the image decoding apparatus may determine to split each of the third coding units 1020*a*, or 1020*b*, 1020*c*, and 1020*d* into coding units, based on at least one of the block shape information and the split shape mode information. According to an embodiment, the image decoding apparatus may determine not to split the second coding unit 1010, based on at least one of the block shape information and the split shape mode information. According to an embodiment, the image decoding apparatus may split the non-square second coding unit 1010 into the odd number of third coding units 1020*b*, 1020*c*, and 1020*d*. The image decoding apparatus may put a predetermined restriction on a predetermined third coding unit from among the odd number of third coding units 1020*b*, 1020*c*, and 1020*d*. For example, the image decoding apparatus may restrict the third coding unit 1020*c* at a center location from among the odd number of third coding units 1020*b*, 1020*c*, and 1020*d* to be no longer split or to be split a settable number of times.

Referring to FIG. 10, the image decoding apparatus may restrict the third coding unit 1020*c*, which is at the center location from among the odd number of third coding units 1020*b*, 1020*c*, and 1020*d* included in the non-square second coding unit 1010, to be no longer split, to be split by using a predetermined splitting method (e.g., split into only four coding units or split by using a splitting method of the second coding unit 1010), or to be split only a predetermined number of times (e.g., split only n times (where n>0)). However, the restrictions on the third coding unit 1020*c* at the center location are not limited to the above-described examples, and may include various restrictions for decoding the third coding unit 1020*c* at the center location differently from the other third coding units 1020*b* and 1020*d*.

According to an embodiment, the image decoding apparatus may obtain at least one of the block shape information and the split shape mode information, which is used to split a current coding unit, from a predetermined location in the current coding unit.

Figure 11:
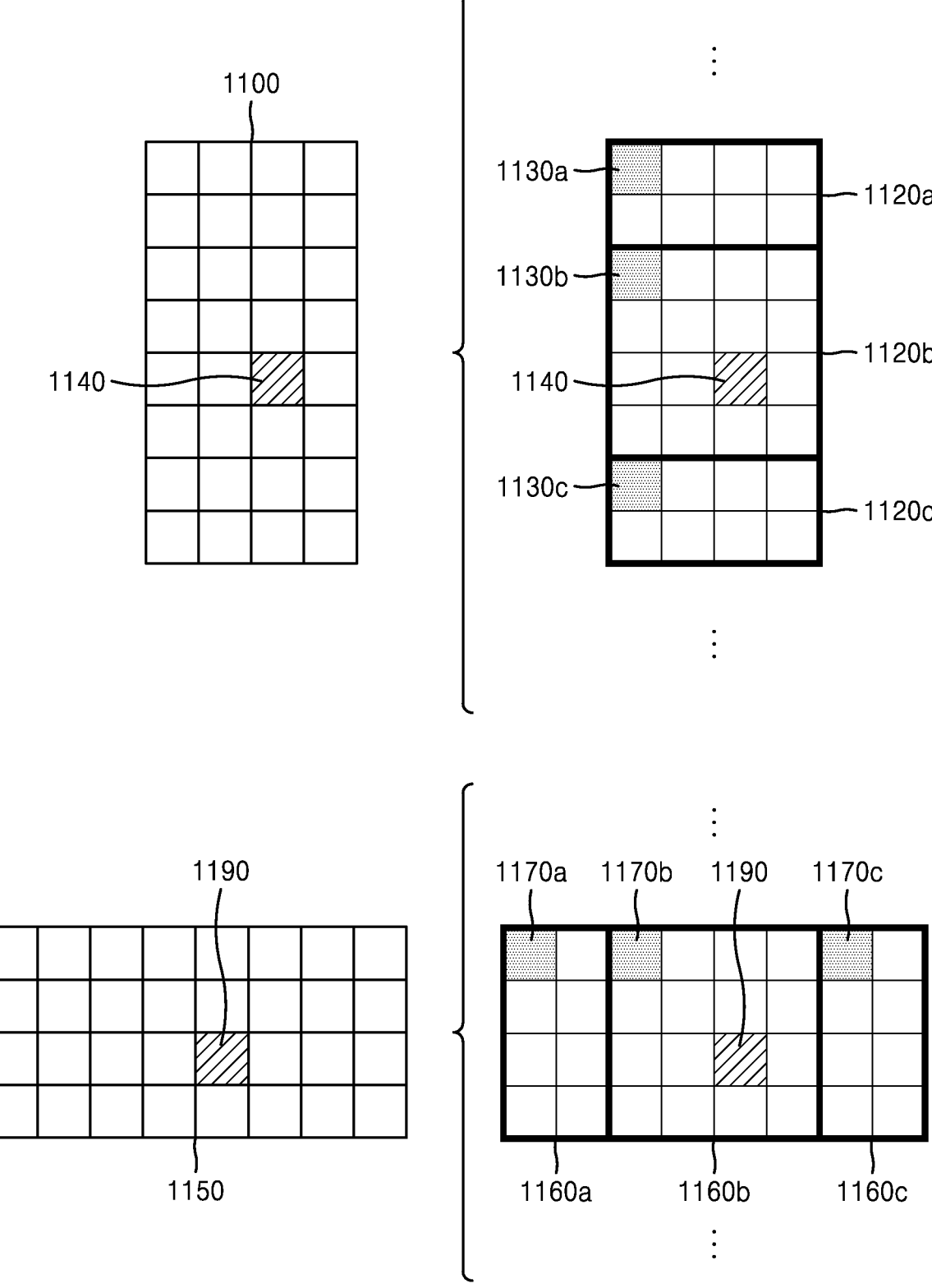
FIG. 11 illustrates a method of determining a predetermined coding unit from among an odd number of coding units, according to an embodiment.

FIG. 11 illustrates a method, performed by the image decoding apparatus, of determining a predetermined coding unit from among an odd number of coding units, according to an embodiment.

Referring to FIG. 11, at least one of block shape information and split shape mode information of a current coding unit 1100 or 1150 may be obtained from a sample of a predetermined location from among a plurality of samples included in the current coding unit 1100 or 1150 (e.g., a sample 1140 or 1190 of a center location). However, the predetermined location in the current coding unit 1100, from which at least one of the block shape information and the split shape mode information may be obtained, is not limited to the center location in FIG. 11, and may include various locations included in the current coding unit 1100 (e.g., top, bottom, left, right, top left, bottom left, top right, and bottom right locations). The image decoding apparatus may obtain at least one of the block shape information and the split shape mode information from the predetermined location and determine to split or not to split the current coding unit into various-shaped and various-sized coding units.

According to an embodiment, when the current coding unit is split into a predetermined number of coding units, the image decoding apparatus may select one of the coding units. Various methods may be used to select one of a plurality of coding units, as will be described below in relation to various embodiments.

According to an embodiment, the image decoding apparatus may split the current coding unit into a plurality of coding units, and may determine a coding unit at a predetermined location.

According to an embodiment, the image decoding apparatus may use information indicating each of locations of the odd number of coding units, to determine a coding unit at a center location from among the odd number of coding units. Referring to FIG. 11, the image decoding apparatus may determine an odd number of coding units 1120*a*, 1120*b*, and 1120*c* or 1160*a*, 1160*b*, and 1160*c* by splitting the current coding unit 1100 or 1150. The image decoding apparatus may determine a coding unit 1120*b* or 1160*b* at a center location by using information about locations of the odd number of coding units 1120*a*, 1120*b*, and 1120*c* or 1160*a*, 1160*b*, and 1160*c*. For example, the image decoding apparatus may determine the coding unit 1120*b* of the center location by determining the locations of the coding units 1120*a*, 1120*b*, and 1120*c* based on information indicating locations of predetermined samples included in the coding units 1120*a*, 1120*b*, and 1120*c*. In detail, the image decoding apparatus may determine the coding unit 1120*b* at the center location by determining the locations of the coding units 1120*a*, 1120*b*, and 1120*c* based on information indicating locations of top left samples 1130*a*, 1130*b*, and 1130*c* of the coding units 1120*a*, 1120*b*, and 1120*c*.

According to an embodiment, the information indicating the locations of the top left samples 1130*a*, 1130*b*, and 1130*c*, which are included in the coding units 1120*a*, 1120*b*, and 1120*c*, respectively, may include information about locations or coordinates of the coding units 1120*a*, 1120*b*, and 1120*c* in a picture. According to an embodiment, the information indicating the locations of the top left samples 1130*a*, 1130*b*, and 1130*c*, which are included in the coding units 1120*a*, 1120*b*, and 1120*c*, respectively, may include information indicating widths or heights of the coding units 1120*a*, 1120*b*, and 1120*c* included in the current coding unit 1100, and the widths or heights may correspond to information indicating differences between the coordinates of the coding units 1120*a*, 1120*b*, and 1120*c* in the picture. That is, the image decoding apparatus may determine the coding unit 1120*b* at the center location by directly using the information about the locations or coordinates of the coding units 1120*a*, 1120*b*, and 1120*c* in the picture, or by using the information about the widths or heights of the coding units, which correspond to the difference values between the coordinates.

According to an embodiment, information indicating the location of the top left sample 1130*a* of the upper coding unit 1120*a* may indicate coordinates (xa, ya), information indicating the location of the top left sample 1130*b* of the middle coding unit 1120*b* may indicate coordinates (xb, yb), and information indicating the location of the top left sample 1130*c* of the lower coding unit 1120*c* may indicate coordinates (xc, yc). The image decoding apparatus may determine the middle coding unit 1120*b* by using the coordinates of the top left samples 1130*a*, 1130*b*, and 1130*c* which are included in the coding units 1120*a*, 1120*b*, and 1120*c*, respectively. For example, when the coordinates of the top left samples 1130*a*, 1130*b*, and 1130*c* are sorted in an ascending or descending order, the coding unit 1120*b* including the coordinates (xb, yb) of the sample 1130*b* at a center location may be determined as a coding unit at a center location from among the coding units 1120*a*, 1120*b*, and 1120*c* determined by splitting the current coding unit 1100. However, the coordinates indicating the locations of the top left samples 1130*a*, 1130*b*, and 1130*c* may include coordinates indicating absolute locations in the picture, or may use coordinates (dxb, dyb) indicating a relative location of the top left sample 1130*b* of the middle coding unit 1120*b* and coordinates (dxc, dyc) indicating a relative location of the top left sample 1130*c* of the lower coding unit 1120*c* with reference to the location of the top left sample 1130*a* of the upper coding unit 1120*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus may split the current coding unit 1100 into a plurality of coding units 1120*a*, 1120*b*, and 1120*c*, and may select one of the coding units 1120*a*, 1120*b*, and 1120*c* based on a predetermined criterion. For example, the image decoding apparatus may select the coding unit 1120*b*, which has a size different from that of the others, from among the coding units 1120*a*, 1120*b*, and 1120*c*.

According to an embodiment, the image decoding apparatus may determine the widths or heights of the coding units 1120*a*, 1120*b*, and 1120*c* by using the coordinates (xa, ya) indicating the location of the top left sample 1130*a* of the upper coding unit 1120*a*, the coordinates (xb, yb) indicating the location of the top left sample 1130*b* of the middle coding unit 1120*b*, and the coordinates (xc, yc) indicating the location of the top left sample 1130*c* of the lower coding unit 1120*c*. The image decoding apparatus may determine the respective sizes of the coding units 1120*a*, 1120*b*, and 1120*c* by using the coordinates (xa, ya), (xb, yb), and (xc, yc) indicating the locations of the coding units 1120*a*, 1120*b*, and 1120*c*. According to an embodiment, the image decoding apparatus may determine the width of the upper coding unit 1120*a* as the width of the current coding unit 1100. According to an embodiment, the image decoding apparatus may determine the height of the upper coding unit 1120*a* as yb-ya. According to an embodiment, the image decoding apparatus may determine the width of the middle coding unit 1120*b* as the width of the current coding unit 1100. According to an embodiment, the image decoding apparatus may determine the height of the middle coding unit 1120*b* as yc-yb. According to an embodiment, the image decoding apparatus may determine the width or height of the lower coding unit by using the width or height of the current coding unit and the widths or heights of the upper and middle coding units 1120*a* and 1120*b*. The image decoding apparatus may determine a coding unit, which has a size different from that of the others, based on the determined widths and heights of the coding units 1120*a*, 1120*b*, and 1120*c*. Referring to FIG. 11, the image decoding apparatus may determine the middle coding unit 1120*b*, which has a size different from the size of the upper and lower coding units 1120*a* and 1120*c*, as the coding unit of the predetermined location. However, the above-described method, performed by the image decoding apparatus, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus may determine the widths or heights of the coding units 1160*a*, 1160*b*, and 1160*c* by using the coordinates (xd, yd) indicating the location of a top left sample 1170*a* of the left coding unit 1160*a*, the coordinates (xe, ye) indicating the location of a top left sample 1170*b* of the middle coding unit 1160*b*, and the coordinates (xf, yf) indicating the location of a top left sample 1170*c* of the right coding unit 1160*c*. The image decoding apparatus may determine the respective sizes of the coding units 1160*a*, 1160*b*, and 1160*c* by using the coordinates (xd, yd), (xe, ye), and (xf, yf) indicating the locations of the coding units 1160*a*, 1160*b*, and 1160*c*.

According to an embodiment, the image decoding apparatus may determine the width of the left coding unit 1160*a* as xe-xd. According to an embodiment, the image decoding apparatus may determine the height of the left coding unit 1160*a* as the height of the current coding unit 1150. According to an embodiment, the image decoding apparatus may determine the width of the middle coding unit 1160*b* as xf-xe. According to an embodiment, the image decoding apparatus may determine the height of the middle coding unit 1160*b* as the height of the current coding unit 1150. According to an embodiment, the image decoding apparatus may determine the width or height of the right coding unit 1160*c* by using the width or height of the current coding unit 1150 and the widths or heights of the left and middle coding units 1160*a* and 1160*b*. The image decoding apparatus may determine a coding unit, which has a size different from that of the others, based on the determined widths and heights of the coding units 1160*a*, 1160*b*, and 1160*c*. Referring to FIG. 11, the image decoding apparatus may determine the middle coding unit 1160*b*, which has a size different from the size of the upper and lower coding units 1160*a* and 1160*c*, as the coding unit of the predetermined location. However, the above-described method, performed by the image decoding apparatus, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus may select a coding unit at a predetermined location from among an odd number of coding units determined by splitting the current coding unit, considering the shape of the current coding unit. For example, when the current coding unit has a non-square shape, a width of which is longer than a height, the image decoding apparatus may determine the coding unit at the predetermined location in a horizontal direction. That is, the image decoding apparatus may determine one of coding units at different locations in a horizontal direction and put a restriction on the coding unit. When the current coding unit has a non-square shape, a height of which is longer than a width, the image decoding apparatus may determine the coding unit at the predetermined location in a vertical direction. That is, the image decoding apparatus may determine one of coding units at different locations in a vertical direction and may put a restriction on the coding unit.

According to an embodiment, the image decoding apparatus may use information indicating respective locations of an even number of coding units, to determine the coding unit at the predetermined location from among the even number of coding units. The image decoding apparatus may determine an even number of coding units by binary-splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 11, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus may use at least one of block shape information and split shape mode information, which is stored in a sample included in a coding unit at a center location, in a splitting operation to determine the coding unit at the center location from among the plurality of coding units determined by splitting the current coding unit.

Referring to FIG. 11, the image decoding apparatus may split the current coding unit 1100 into a plurality of coding units 1120a, 1120b, and 1120c based on at least one of the block shape information and the split shape mode information, and may determine a coding unit 1120b at a center location from among the plurality of the coding units 1120a, 1120b, and 1120c. Furthermore, the image decoding apparatus may determine the coding unit 1120b at the center location, in consideration of a location from which at least one of the block shape information and the split shape mode information is obtained. That is, at least one of the block shape information and the split shape mode information of the current coding unit 1100 may be obtained from the sample 1140 at a center location of the current coding unit 1100 and, when the current coding unit 1100 is split into the plurality of coding units 1120a, 1120b, and 1120c based on at least one of the block shape information and the split shape mode information, the coding unit 1120b including the sample 1140 may be determined as the coding unit at the center location. However, information used to determine the coding unit at the center location is not limited to at least one of the block shape information and the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 11, the image decoding apparatus may use at least one of the block shape information and the split shape mode information, which is obtained from a sample at a predetermined location in the current coding unit 1100 (e.g., a sample at a center location of the current coding unit 1100) to determine a coding unit at a predetermined location from among the plurality of the coding units 1120a, 1120b, and 1120c determined by splitting the current coding unit 1100 (e.g., a coding unit at a center location from among a plurality of split coding units). That is, the image decoding apparatus may determine the sample at the predetermined location by considering a block shape of the current coding unit 1100, determine the coding unit 1120b including a sample, from which predetermined information (e.g., at least one of the block shape information and the split shape mode information) may be obtained, from among the plurality of coding units 1120a, 1120b, and 1120c determined by splitting the current coding unit 1100, and may put a predetermined restriction on the coding unit 1120b. Referring to FIG. 11, according to an embodiment, the image decoding apparatus may determine the sample 1140 at the center location of the current coding unit 1100 as the sample from which the predetermined information may be obtained, and may put a predetermined restriction on the coding unit 1120b including the sample 1140, in a decoding operation. However, the location of the sample from which the predetermined information may be obtained is not limited to the above-described location, and may include arbitrary locations of samples included in the coding unit 1120b to be determined for a restriction.

According to an embodiment, the location of the sample from which the predetermined information may be obtained may be determined based on the shape of the current coding unit 1100. According to an embodiment, the block shape information may indicate whether the current coding unit has a square or non-square shape, and the location of the sample from which the predetermined information may be obtained may be determined based on the shape. For example, the image decoding apparatus may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus may determine one of samples adjacent to a boundary for dividing a long side of the current coding unit in half, as the sample from which the predetermined information may be obtained.

According to an embodiment, when the current coding unit is split into a plurality of coding units, the image decoding apparatus may use at least one of the block shape information and the split shape mode information to determine a coding unit at a predetermined location from among the plurality of coding units. According to an embodiment, the image decoding apparatus may obtain at least one of the block shape information and the split shape mode information from a sample at a predetermined location in a coding unit, and split the plurality of coding units, which are generated by splitting the current coding unit, by using at least one of the split shape mode information and the block shape information, which is obtained from the sample of the predetermined location in each of the plurality of coding units. That is, a coding unit may be recursively split based on at least one of the block shape information and the split shape mode information, which is obtained from the sample at the predetermined location in each coding unit. An operation of recursively splitting a coding unit has been described above in relation to FIG. 10, and thus detailed descriptions thereof will not be provided here.

According to an embodiment, the image decoding apparatus may determine one or more coding units by splitting the current coding unit, and may determine an order of decoding the one or more coding units, based on a predetermined block (e.g., the current coding unit).

Figure 12:
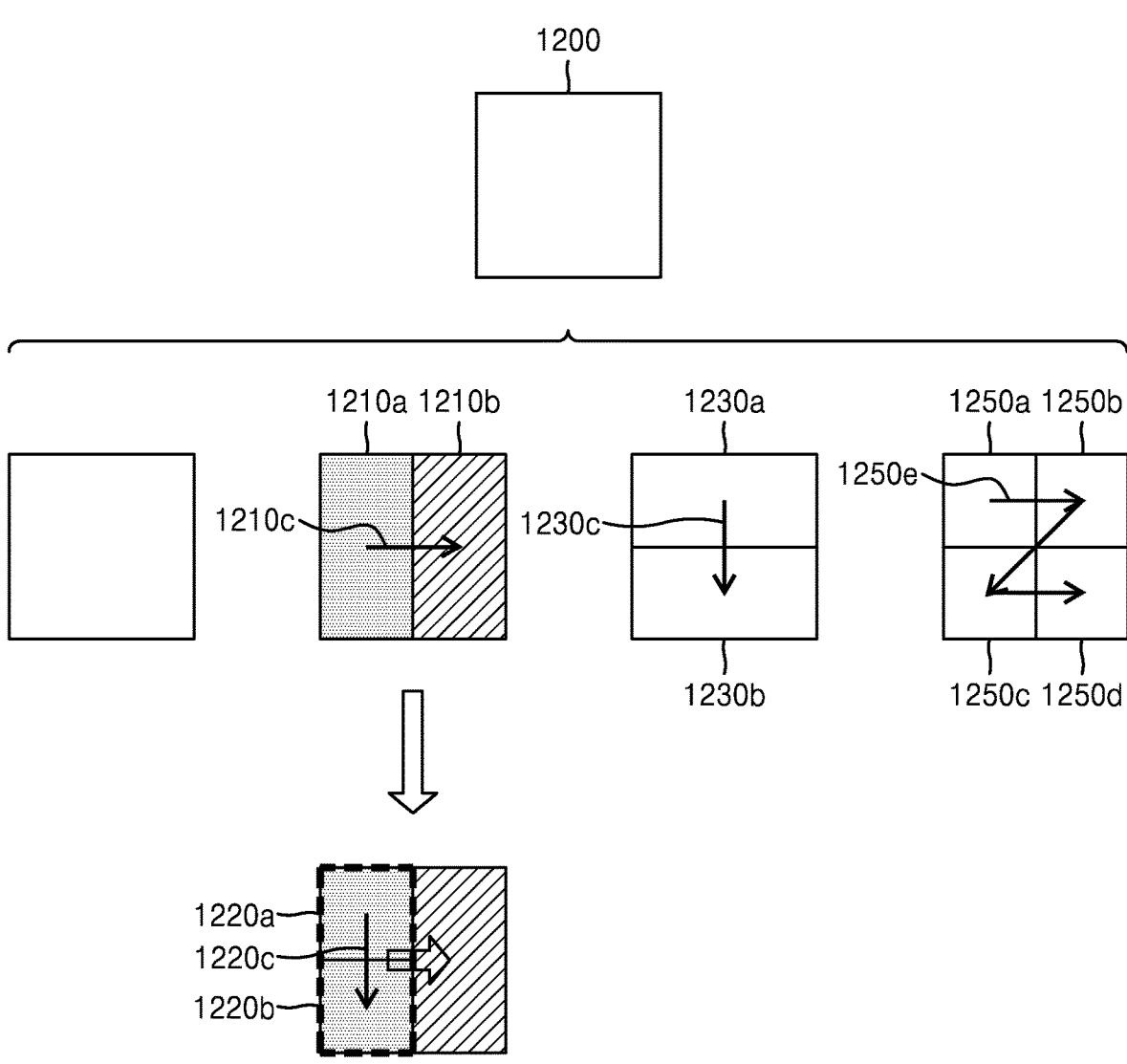
FIG. 12 illustrates an order of processing a plurality of coding units when the plurality of coding units are determined by splitting a current coding unit, according to an embodiment.

FIG. 12 illustrates an order of processing a plurality of coding units when the image decoding apparatus determines the plurality of coding units by splitting a current coding unit, according to an embodiment.

According to an embodiment, the image decoding apparatus may determine second coding units 1210a and 1210b by splitting a first coding unit 1200 in a vertical direction, determine second coding units 1230a and 1230b by splitting the first coding unit 1200 in a horizontal direction, or determine second coding units 1250a to 1250d by splitting the first coding unit 1200 in vertical and horizontal directions, based on block shape information and split shape mode information.

Referring to FIG. 12, the image decoding apparatus may determine to process the second coding units 1210a and 1210b, which are determined by splitting the first coding unit 1200 in a vertical direction, in a horizontal direction order 1210c. The image decoding apparatus may determine to process the second coding units 1230a and 1230b, which are determined by splitting the first coding unit 1200 in a horizontal direction, in a vertical direction order 1230c. The image decoding apparatus may determine to process the second coding units 1250a to 1250d, which are determined by splitting the first coding unit 1200 in vertical and horizontal directions, in a predetermined order for processing coding units in a row and then processing coding units in a next row (e.g., in a raster scan order or Z-scan order 1250e).

According to an embodiment, the image decoding apparatus may recursively split coding units. Referring to FIG. 12, the image decoding apparatus may determine a plurality of coding units 1210a, 1210b, 1230a, 1230b, 1250a, 1250b, 1250c, and 1250d by splitting the first coding unit 1200, and may recursively split each of the determined plurality of coding units 1210a, 1210b, 1230a, 1230b, 1250a, 1250b, 1250c, and 1250d. A splitting method of the plurality of coding units 1210a, 1210b, 1230a, 1230b, 1250a, 1250b, 1250c, and 1250d may correspond to a splitting method of the first coding unit 1200. As such, each of the plurality of coding units 1210a, 1210b, 1230a, 1230b, 1250a, 1250b, 1250c, and 1250d may be independently split into a plurality of coding units. Referring to FIG. 12, the image decoding apparatus may determine the second coding units 1210a and 1210b by splitting the first coding unit 1200 in a vertical direction, and may determine to independently split or not to split each of the second coding units 1210a and 1210b.

According to an embodiment, the image decoding apparatus may determine third coding units 1220a and 1220b by splitting the left second coding unit 1210a in a horizontal direction, and may not split the right second coding unit 1210b.

According to an embodiment, a processing order of coding units may be determined based on an operation of splitting a coding unit. In other words, a processing order of split coding units may be determined based on a processing order of coding units immediately before being split. The image decoding apparatus may determine a processing order of the third coding units 1220a and 1220b determined by splitting the left second coding unit 1210a, independently of the right second coding unit 1210b. Because the third coding units 1220a and 1220b are determined by splitting the left second coding unit 1210a in a horizontal direction, the third coding units 1220a and 1220b may be processed in a vertical direction order 1220c. Because the left and right second coding units 1210a and 1210b are processed in the horizontal direction order 1210c, the right second coding unit 1210b may be processed after the third coding units 1220a and 1220b included in the left second coding unit 1210a are processed in the vertical direction order 1220c. An operation of determining a processing order of coding units based on a coding unit before being split is not limited to the above-described example, and various methods may be used to independently process coding units, which are split and determined to various shapes, in a predetermined order.

Figure 13:
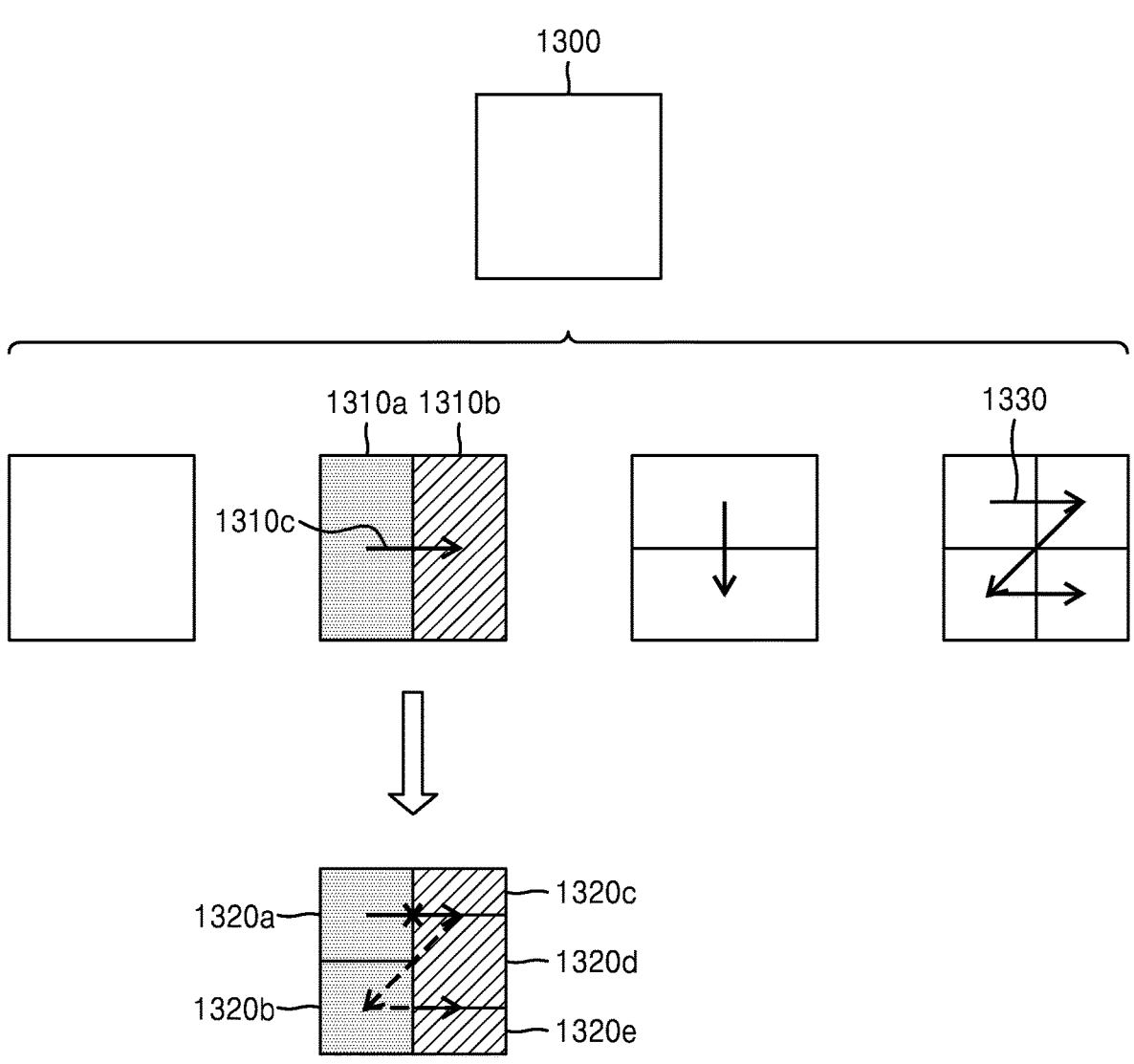
FIG. 13 illustrates a process of determining that a current coding unit is to be split into an odd number of coding units, when the coding units are not processable in a predetermined order, according to an embodiment.

FIG. 13 illustrates a process, performed by the image decoding apparatus, of determining that a current coding unit is to be split into an odd number of coding units, when the coding units are not processable in a predetermined order, according to an embodiment.

According to an embodiment, the image decoding apparatus may determine whether the current coding unit is split into an odd number of coding units, based on obtained block shape information and split shape mode information. Referring to FIG. 13, a square first coding unit 1300 may be split into non-square second coding units 1310a and 1310b, and the second coding units 1310a and 1310b may be independently split into third coding units 1320a and 1320b, and 1320c to 1320e. According to an embodiment, the image decoding apparatus may determine a plurality of third coding units 1320a and 1320b by splitting the left second coding unit 1310a in a horizontal direction, and may split the right second coding unit 1310b into an odd number of third coding units 1320c to 1320e.

According to an embodiment, the image decoding apparatus may determine whether any coding unit is split into an odd number of coding units, by determining whether third coding units 1320a and 1320b, and 1320c to 1320e are processable in a predetermined order. Referring to FIG. 13, the image decoding apparatus may determine the third coding units 1320a and 1320b, and 1320c to 1320e by recursively splitting the first coding unit 1300. The image decoding apparatus may determine whether any of the first coding unit 1300, the second coding units 1310a and 1310b, and the third coding units 1320a and 1320b, and 1320c, 1320d, and 1320e are split into an odd number of coding units, based on at least one of the block shape information and the split shape mode information. For example, the second coding unit 1310b which is located at the right side of the second coding units 1310a and 1310b may be split into an odd number of third coding units 1320c, 1320d, and 1320e. A processing order of a plurality of coding units included in the first coding unit 1300 may be a predetermined order (e.g., a Z-scan order 1330), and the image decoding apparatus may decide whether the third coding units 1320c, 1320d, and 1320e, which are determined by splitting the right second coding unit 1310b into an odd number of coding units, satisfy a condition for processing in the predetermined order.

According to an embodiment, the image decoding apparatus may determine whether the third coding units 1320a and 1320b, and 1320c, 1320d, and 1320e included in the first coding unit 1300 satisfy the condition for processing in the predetermined order, and the condition relates to whether at least one of a width and height of the second coding units 1310a and 1310b is divided in half along a boundary of the third coding units 1320a and 1320b, and 1320c, 1320d, and 1320e. For example, the third coding units 1320a and 1320b determined by dividing the height of the non-square left second coding unit 1310a in half satisfy the condition. Because boundaries of the third coding units 1320c, 1320d, and 1320e determined by splitting the right second coding unit 1310b into three coding units do not divide the width or height of the right second coding unit 1310b in half, it may be determined that the third coding units 1320c, 1320d, and 1320e do not satisfy the condition. When the condition is not satisfied as described above, the image decoding apparatus may decide disconnection of a scan order, and determine that the right second coding unit 1310b is split into an odd number of coding units, based on a result of the decision.

According to an embodiment, when a coding unit is split into an odd number of coding units, the image decoding apparatus may put a predetermined restriction on a coding unit at a predetermined location among the split coding units. The restriction or the predetermined location has been described above in relation to various embodiments, and thus detailed descriptions thereof will not be provided here.

Figure 14:
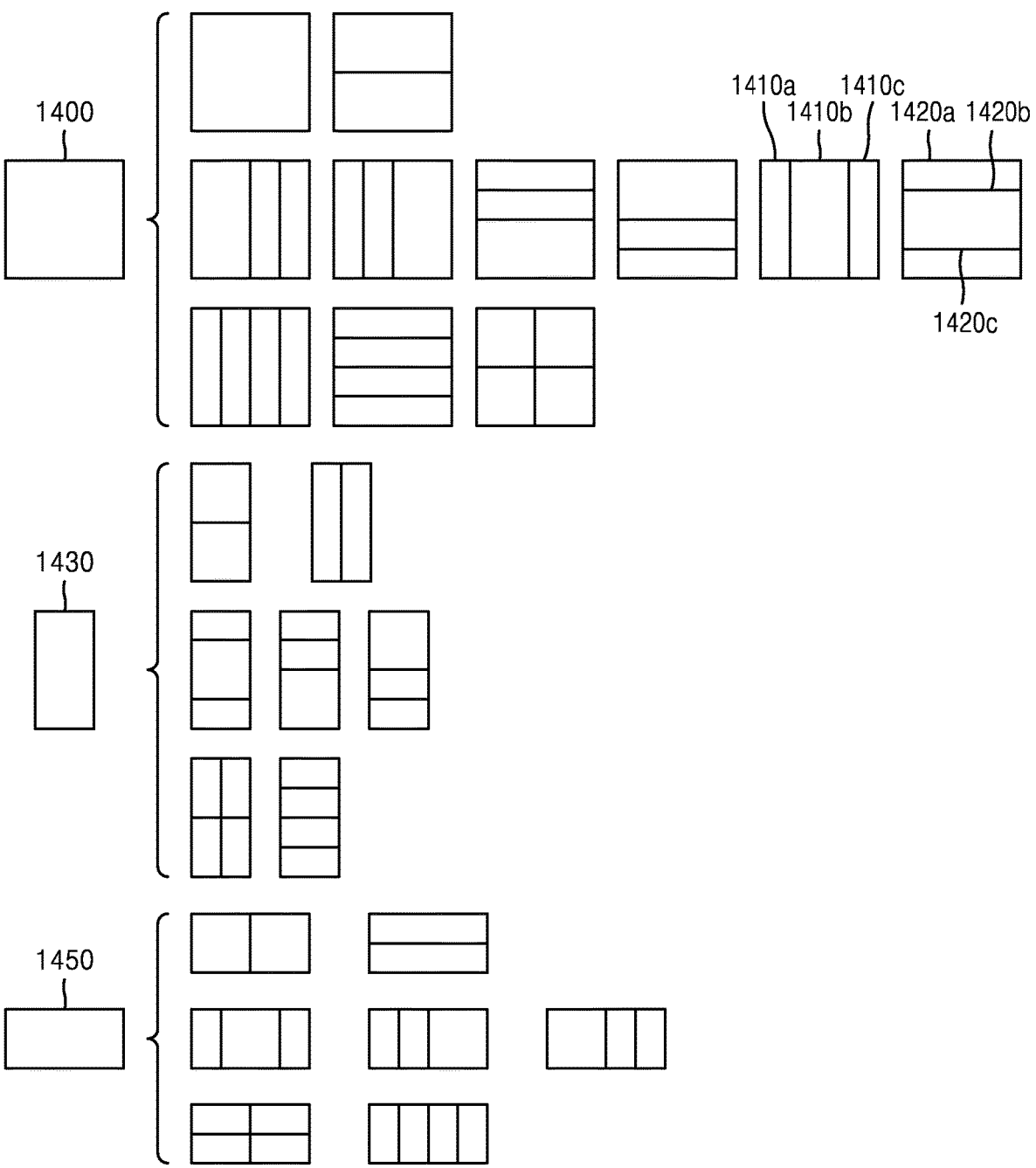
FIG. 14 illustrates a process of determining at least one coding unit by splitting a first coding unit, according to an embodiment.

FIG. 14 illustrates a process, performed by the image decoding apparatus, of determining at least one coding unit by splitting a first coding unit 1400, according to an embodiment.

According to an embodiment, the image decoding apparatus may split the first coding unit 1400, based on at least one of block shape information and split shape mode information, which is obtained by the receiver 110. The square first coding unit 1400 may be split into four square coding units, or may be split into a plurality of non-square coding units. For example, referring to FIG. 14, when the block shape information indicates that the first coding unit 1400 has a square shape and the split shape mode information indicates to split the first coding unit 1400 into non-square coding units, the image decoding apparatus may split the first coding unit 1400 into a plurality of non-square coding units. In detail, when the split shape mode information indicates to determine an odd number of coding units by splitting the first coding unit 1400 in a horizontal direction or a vertical direction, the image decoding apparatus may split the square first coding unit 1400 into an odd number of coding units, e.g., second coding units 1410a, 1410b, and 1410c determined by splitting the square first coding unit 1400 in a vertical direction or second coding units 1420a, 1420b, and 1420c determined by splitting the square first coding unit 1600 in a horizontal direction.

According to an embodiment, the image decoding apparatus may determine whether the second coding units 1410a, 1410b, 1410c, 1420a, 1420b, and 1420c included in the first coding unit 1400 satisfy a condition for processing in a predetermined order, and the condition relates to whether at least one of a width and height of the first coding unit 1400 is divided in half along a boundary of the second coding units 1410a, 1410b, 1410c, 1420a, 1420b, and 1420c. Referring to FIG. 14, because boundaries of the second coding units 1410a, 1410b, and 1410c determined by splitting the square first coding unit 1400 in a vertical direction do not divide the width of the first coding unit 1600 in half, it may be determined that the first coding unit 1400 does not satisfy the condition for processing in the predetermined order. In addition, because boundaries of the second coding units 1420a, 1420b, and 1420c determined by splitting the square first coding unit 1400 in a horizontal direction do not divide the height of the first coding unit 1400 in half, it may be determined that the first coding unit 1400 does not satisfy the condition for processing in the predetermined order. When the condition is not satisfied as described above, the image decoding apparatus may decide disconnection of a scan order, and may determine that the first coding unit 1400 is split into an odd number of coding units, based on a result of the decision. According to an embodiment, when a coding unit is split into an odd number of coding units, the image decoding apparatus may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus may determine various-shaped coding units by splitting a first coding unit.

Referring to FIG. 14, the image decoding apparatus may split the square first coding unit 1400 or a non-square first coding unit 1430 or 1450 into various-shaped coding units.

Figure 15:
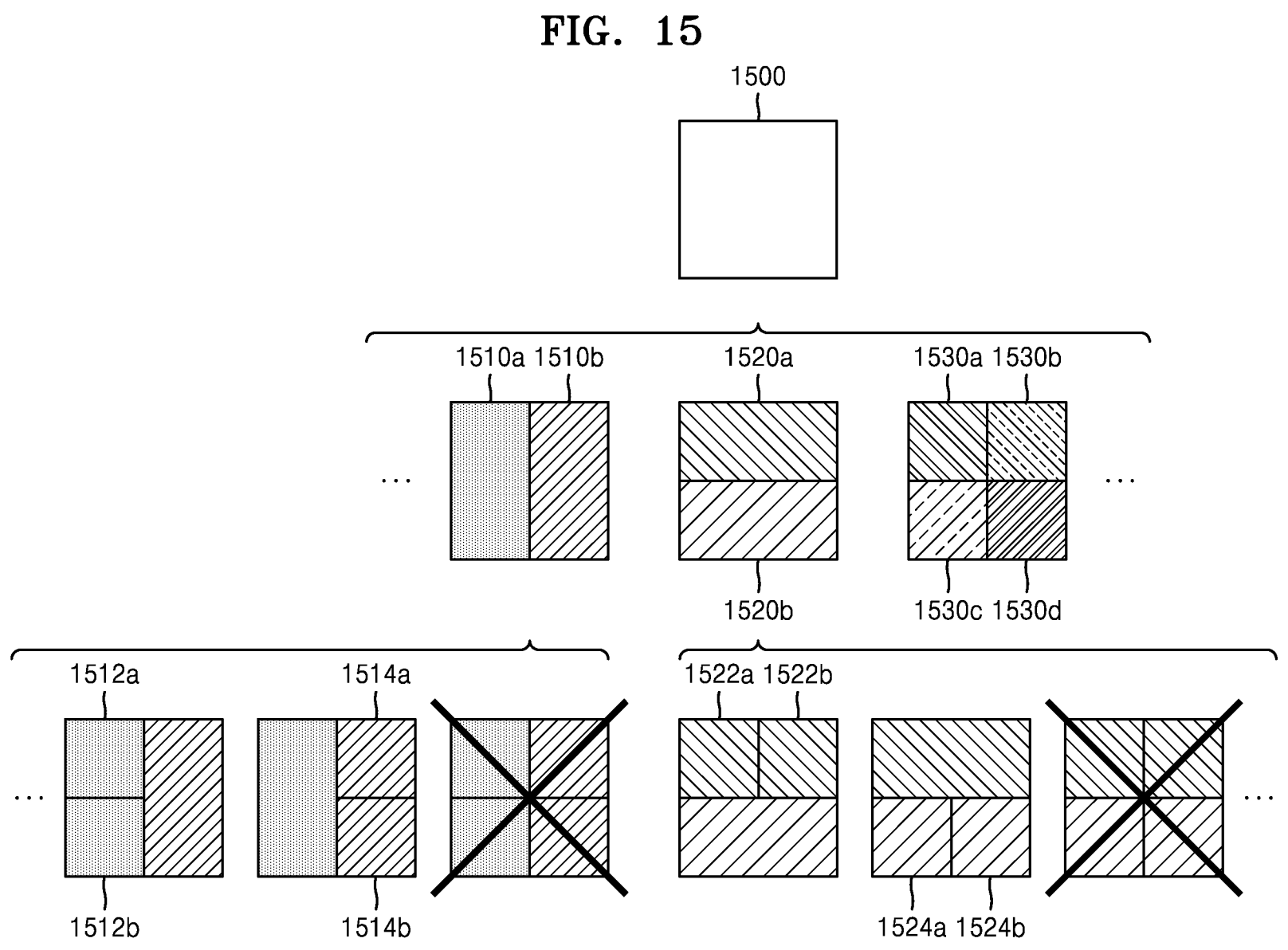

FIG. 15 illustrates that a shape into which a second coding unit is splittable by the image decoding apparatus is restricted when the second coding unit having a non-square shape, which is determined by splitting a first coding unit 1500, satisfies a predetermined condition, according to an embodiment.

According to an embodiment, the image decoding apparatus may determine to split the square first coding unit 1500 into non-square second coding units 1510a, 1510b, 1520a, and 1520b, based on at least one of block shape information and split shape mode information, which is obtained by the receiver 110. The second coding units 1510a, 1510b, 1520a, and 1520b may be independently split. As such, the image decoding apparatus may determine to split or not to split the first coding unit 1500 into a plurality of coding units, based on at least one of the block shape information and the split shape mode information of each of the second coding units 1510a, 1510b, 1520a, and 1520b. According to an embodiment, the image decoding apparatus may determine third coding units 1512a and 1512b by splitting the non-square left second coding unit 1510a, which is determined by splitting the first coding unit 1500 in a vertical direction, in a horizontal direction. However, when the left second coding unit 1510a is split in a horizontal direction, the image decoding apparatus may restrict the right second coding unit 1510b to not be split in a horizontal direction in which the left second coding unit 1510a is split. When third coding units 1514a and 1514b are determined by splitting the right second coding unit 1510b in a same direction, because the left and right second coding units 1510a and 1510b are independently split in a horizontal direction, the third coding units 1512a, 1512b, 1514a, and 1514b may be determined. However, this case serves equally as a case in which the image decoding apparatus splits the first coding unit 1500 into four square second coding units 1530a, 1530b, 1530c, and 1530d, based on at least one of the block shape information and the split shape mode information, and may be inefficient in terms of image decoding.

According to an embodiment, the image decoding apparatus may determine third coding units 1522a, 1522b, 1524a, and 1524b by splitting the non-square second coding unit 1520a or 1520b, which is determined by splitting the first coding unit 1500 in a horizontal direction, in a vertical direction. However, when a second coding unit (e.g., the upper second coding unit 1520a) is split in a vertical direction, for the above-described reason, the image decoding apparatus may restrict the other second coding unit (e.g., the lower second coding unit 1520b) to not be split in a vertical direction in which the upper second coding unit 1520a is split.

Figure 16:
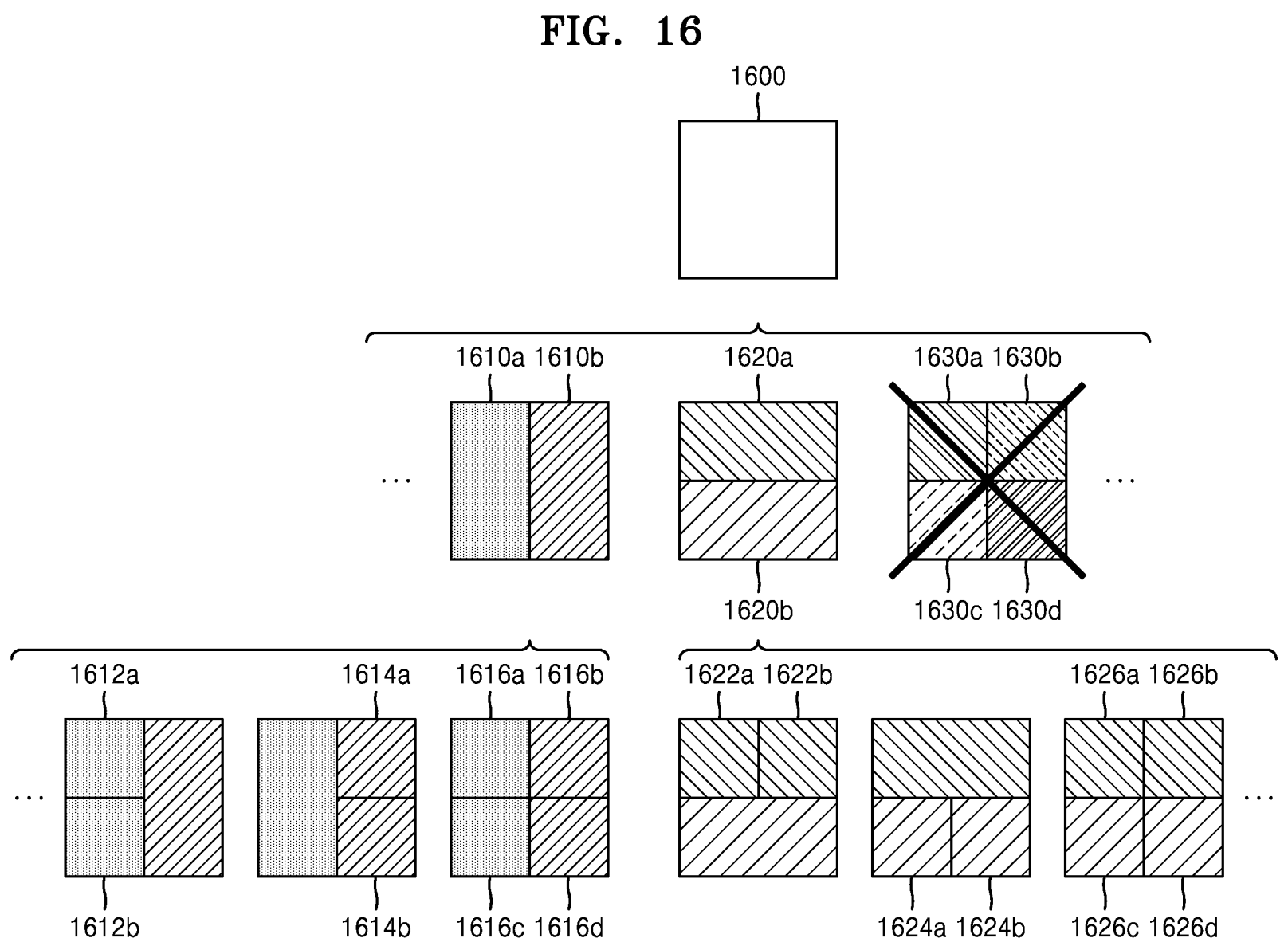

FIG. 16 illustrates a process, performed by the image decoding apparatus, of splitting a square coding unit when split shape mode information indicates that the square coding unit is not to be split into four square coding units, according to an embodiment.

According to an embodiment, the image decoding apparatus may determine second coding units 1610a, 1610b, 1620a, 1620b, etc. by splitting a first coding unit 1600, based on at least one of block shape information and split shape mode information. The split shape mode information may include information about various methods of splitting a coding unit but, the information about various splitting methods may not include information for splitting a coding unit into four square coding units. According to such split shape mode information, the image decoding apparatus may not split the first square coding unit 1600 into four square second coding units 1630a, 1630b, 1630c, and 1630d. The image decoding apparatus may determine the non-square second coding units 1610a, 1610b, 1620a, 1620b, etc., based on the split shape mode information.

According to an embodiment, the image decoding apparatus may independently split the non-square second coding units 1610a, 1610b, 1620a, 1620b, etc. Each of the second coding units 1610a, 1610b, 1620a, 1620b, etc. may be recursively split in a predetermined order, and this splitting method may correspond to a method of splitting the first coding unit 1600, based on at least one of the block shape information and the split shape mode information.

For example, the image decoding apparatus may determine square third coding units 1612a and 1612b by splitting the left second coding unit 1610a in a horizontal direction, and may determine square third coding units 1614a and 1614b by splitting the right second coding unit 1610b in a horizontal direction. Furthermore, the image decoding apparatus may determine square third coding units 1616a, 1616b, 1616c, and 1616d by splitting both of the left and right second coding units 1610a and 1610b in a horizontal direction. In this case, coding units having the same shape as the four square second coding units 1630a, 1630b, 1630c, and 1630d split from the first coding unit 1600 may be determined.

As another example, the image decoding apparatus may determine square third coding units 1622a and 1622b by splitting the upper second coding unit 1620a in a vertical direction, and may determine square third coding units 1624a and 1624b by splitting the lower second coding unit 1620b in a vertical direction. Furthermore, the image decoding apparatus may determine square third coding units 1626a, 1626b, 1626c, and 1626d by splitting both of the upper and lower second coding units 1620a and 1620b in a vertical direction. In this case, coding units having the same shape as the four square second coding units 1630a, 1630b, 1630c, and 1630d split from the first coding unit 1600 may be determined.

Figure 17:
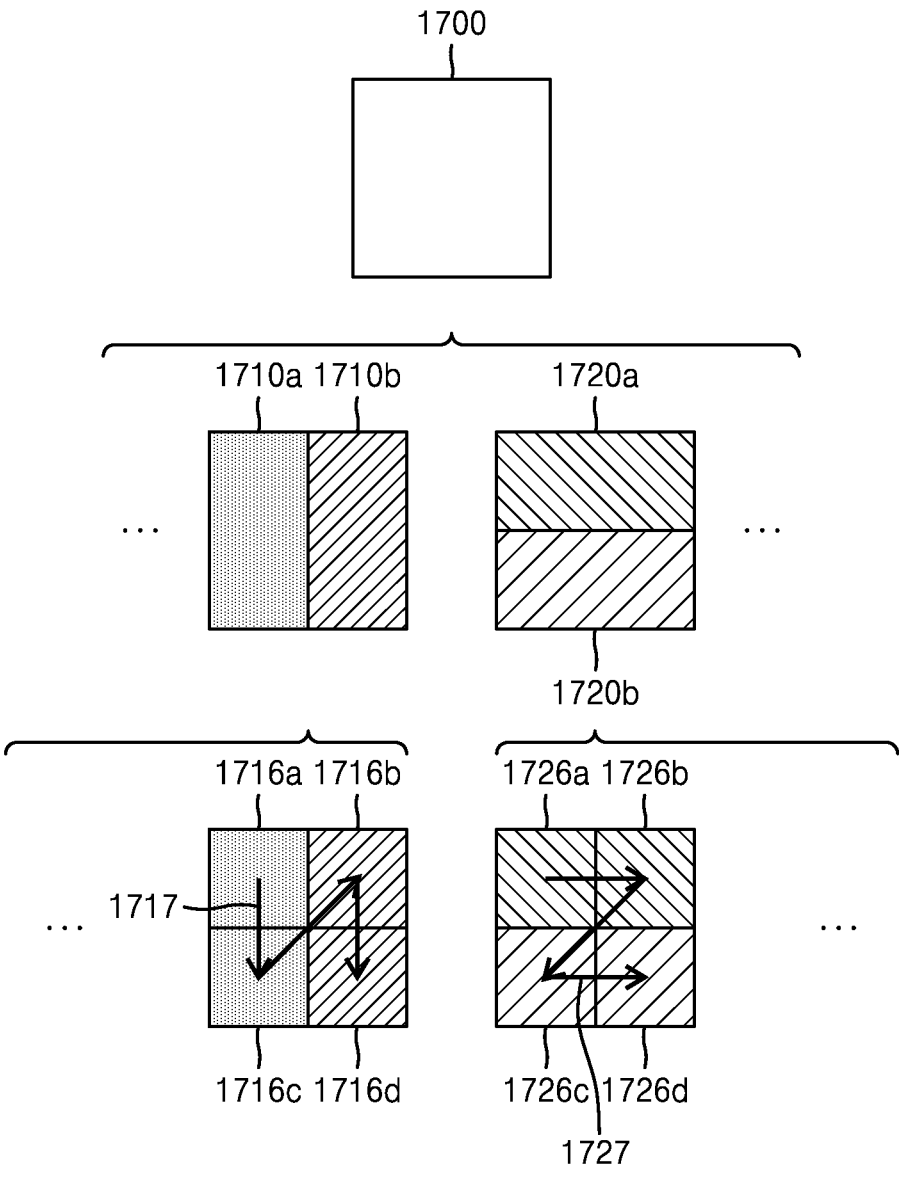
FIG. 17 illustrates that a processing order between a plurality of coding units may be changed depending on a process of splitting a coding unit, according to an embodiment.

FIG. 17 illustrates that a processing order between a plurality of coding units may be changed depending on a process of splitting a coding unit, according to an embodiment.

According to an embodiment, the image decoding apparatus may split a first coding unit 1700, based on block shape information and split shape mode information. When the block shape information indicates a square shape and the split shape mode information indicates to split the first coding unit 1700 in at least one of horizontal and vertical directions, the image decoding apparatus may determine second coding units (e.g., 1710a, 1710b, 1720a, 1720b, etc.) by splitting the first coding unit 1700. Referring to FIG. 17, the non-square second coding units 1710a, 1710b, 1720a, and 1720b determined by splitting the first coding unit 1700 in only a horizontal direction or vertical direction may be independently split based on the block shape information and the split shape mode information of each coding unit. For example, the image decoding apparatus may determine third coding units 1716a, 1716b, 1716c, and 1716d by splitting the second coding units 1710a and 1710b, which are generated by splitting the first coding unit 1700 in a vertical direction, in a horizontal direction, and may determine third coding units 1726a, 1726b, 1726c, and 1726d by splitting the second coding units 1720a and 1720b, which are generated by splitting the first coding unit 1700 in a horizontal direction, in a vertical direction. An operation of splitting the second coding units 1710a, 1710b, 1720a, and 1720b has been described above in relation to FIG. 16, and thus detailed descriptions thereof will not be provided herein.

According to an embodiment, the image decoding apparatus may process coding units in a predetermined order. An operation of processing coding units in a predetermined order has been described above in relation to FIG. 17, and thus detailed descriptions thereof will not be provided herein. Referring to FIG. 17, the image decoding apparatus may determine four square third coding units 1716a, 1716b, 1716c, and 1716d, and 1726a, 1726b, 1726c, and 1726d by splitting the square first coding unit 1700. According to an embodiment, the image decoding apparatus may determine processing orders of the third coding units 1716a, 1716b, 1716c, and 1716d, and 1726a, 1726b, 1726c, and 1726d based on a splitting method of the first coding unit 1700.

According to an embodiment, the image decoding apparatus may determine the third coding units 1716a, 1716b, 1716c, and 1716d by splitting the second coding units 1710a and 1710b generated by splitting the first coding unit 1700 in a vertical direction, in a horizontal direction, and may process the third coding units 1716a, 1716b, 1716c, and 1716d in a processing order 1717 for initially processing the third coding units 1716a and 1716c, which are included in the left second coding unit 1710a, in a vertical direction and then processing the third coding unit 1716b and 1716d, which are included in the right second coding unit 1710b, in a vertical direction.

According to an embodiment, the image decoding apparatus may determine the third coding units 1726a, 1726b, 1726c, and 1726d by splitting the second coding units 1720a and 1720b generated by splitting the first coding unit 1700 in a horizontal direction, in a vertical direction, and may process the third coding units 1726a, 1726b, 1726c, and 1726d in a processing order 1727 for initially processing the third coding units 1726a and 1726b, which are included in the upper second coding unit 1720a, in a horizontal direction and then processing the third coding unit 1726c and 1726d, which are included in the lower second coding unit 1720b, in a horizontal direction.

Referring to FIG. 17, the square third coding units 1716a, 1716b, 1716c, and 1716d, and 1726a, 1726b, 1726c, and 1726d may be determined by splitting the second coding units 1710a, 1710b, 1720a, and 1720b, respectively. Although the second coding units 1710a and 1710b are determined by splitting the first coding unit 1700 in a vertical direction differently from the second coding units 1720a and 1720b which are determined by splitting the first coding unit 1700 in a horizontal direction, the third coding units 1716a, 1716b, 1716c, and 1716d, and 1726a, 1726b, 1726c, and 1726d split therefrom eventually show same-shaped coding units split from the first coding unit 1700. As such, by recursively splitting a coding unit in different manners based on at least one of the block shape information and the split shape mode information, the image decoding apparatus may process a plurality of coding units in different orders even when the coding units are eventually determined to be the same shape.

FIG. 18 illustrates a process of determining a depth of a coding unit as a shape and size of the coding unit change, when the coding unit is recursively split such that a plurality of coding units are determined, according to an embodiment.

According to an embodiment, the image decoding apparatus may determine the depth of the coding unit, based on a predetermined criterion. For example, the predetermined criterion may be the length of a long side of the coding unit. When the length of a long side of a coding unit before being split is 2 n times (n>0) the length of a long side of a split current coding unit, the image decoding apparatus may determine that a depth of the current coding unit is increased from a depth of the coding unit before being split, by n. In the following description, a coding unit having an increased depth is expressed as a coding unit of a deeper depth.

Referring to FIG. 18, according to an embodiment, the image decoding apparatus may determine a second coding unit 1802 and a third coding unit 1804 of deeper depths by splitting a square first coding unit 1800 based on block shape information indicating a square shape (for example, the block shape information may be expressed as '0: SQUARE'). Assuming that the size of the square first coding unit 1800 is 2N×2N, the second coding unit 1802 determined by dividing a width and height of the first coding unit 1800 to ½ may have a size of N×N. Furthermore, the third coding unit 1804 determined by dividing a width and height of the second coding unit 1802 to ½ may have a size of N/2×N/2. In this case, a width and height of the third coding unit 1804 are ¼ times those of the first coding unit 1800. When a depth of the first coding unit 1800 is D, a depth of the second coding unit 1802, the width and height of which are ½ times those of the first coding unit 1800, may be D+1, and a depth of the third coding unit 1804, the width and height of which are ¼ times those of the first coding unit 1800, may be D+2.

According to an embodiment, the image decoding apparatus may determine a second coding unit 1812 or 1822 and a third coding unit 1814 or 1824 of deeper depths by splitting a non-square first coding unit 1810 or 1820 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus may determine a second coding unit 1802, 1812, or 1822 by dividing at least one of a width and height of the first coding unit 1810 having a size of N×2N. That is, the image decoding apparatus may determine the second coding unit 1802 having a size of N×N or the second coding unit 1822 having a size of N×N/2 by splitting the first coding unit 1810 in a horizontal direction, or may determine the second coding unit 1812 having a size of N/2×N by splitting the first coding unit 1810 in horizontal and vertical directions.

According to an embodiment, the image decoding apparatus may determine the second coding unit 1802, 1812, or 1822 by dividing at least one of a width and height of the first coding unit 1820 having a size of 2N×N. That is, the image decoding apparatus may determine the second coding unit 1802 having a size of N×N or the second coding unit 2012 having a size of N/2×N by splitting the first coding unit 1820 in a vertical direction, or may determine the second coding unit 1822 having a size of N×N/2 by splitting the first coding unit 1820 in horizontal and vertical directions.

According to an embodiment, the image decoding apparatus may determine a third coding unit 1804, 1814, or 1824 by dividing at least one of a width and height of the second coding unit 1802 having a size of N×N. That is, the image decoding apparatus may determine the third coding unit 1804 having a size of N/2×N/2, the third coding unit 1814 having a size of N/4×N/2, or the third coding unit 1824 having a size of N/2×N/4 by splitting the second coding unit 1802 in vertical and horizontal directions.

According to an embodiment, the image decoding apparatus may determine the third coding unit 1804, 1814, or 1824 by dividing at least one of a width and height of the second coding unit 1812 having a size of N/2×N. That is, the image decoding apparatus may determine the third coding unit 1804 having a size of N/2×N/2 or the third coding unit 1824 having a size of N/2×N/4 by splitting the second coding unit 1812 in a horizontal direction, or may determine the third coding unit 1814 having a size of N/4×N/2 by splitting the second coding unit 1812 in vertical and horizontal directions.

According to an embodiment, the image decoding apparatus may determine the third coding unit 1804, 1814, or 1824 by dividing at least one of a width and height of the second coding unit 1822 having a size of N×N/2. That is, the image decoding apparatus may determine the third coding unit 1804 having a size of N/2×N/2 or the third coding unit 1814 having a size of N/4×N/2 by splitting the second coding unit 1822 in a vertical direction, or may determine the third coding unit 1824 having a size of N/2×N/4 by splitting the second coding unit 1822 in vertical and horizontal directions.

According to an embodiment, the image decoding apparatus may split the square coding unit 1800, 1802, or 1804 in a horizontal or vertical direction. For example, the image decoding apparatus may determine the first coding unit 1810 having a size of N×2N by splitting the first coding unit 1800 having a size of 2N×2N in a vertical direction, or may determine the first coding unit 1820 having a size of 2N×N by splitting the first coding unit 1800 in a horizontal direction. According to an embodiment, when a depth is determined based on the length of the longest side of a coding unit, a depth of a coding unit determined by splitting the first coding unit 1800 having a size of 2N×2N in a horizontal or vertical direction may be the same as the depth of the first coding unit 1800.

According to an embodiment, a width and height of the third coding unit 1814 or 1824 may be ¼ times those of the first coding unit 1810 or 1820. When a depth of the first coding unit 1810 or 1820 is D, a depth of the second coding unit 1812 or 1822, the width and height of which are ½ times those of the first coding unit 1810 or 1820, may be D+1, and a depth of the third coding unit 1814 or 1824, the width and height of which are ¼ times those of the first coding unit 1810 or 1820, may be D+2.

Figure 19:
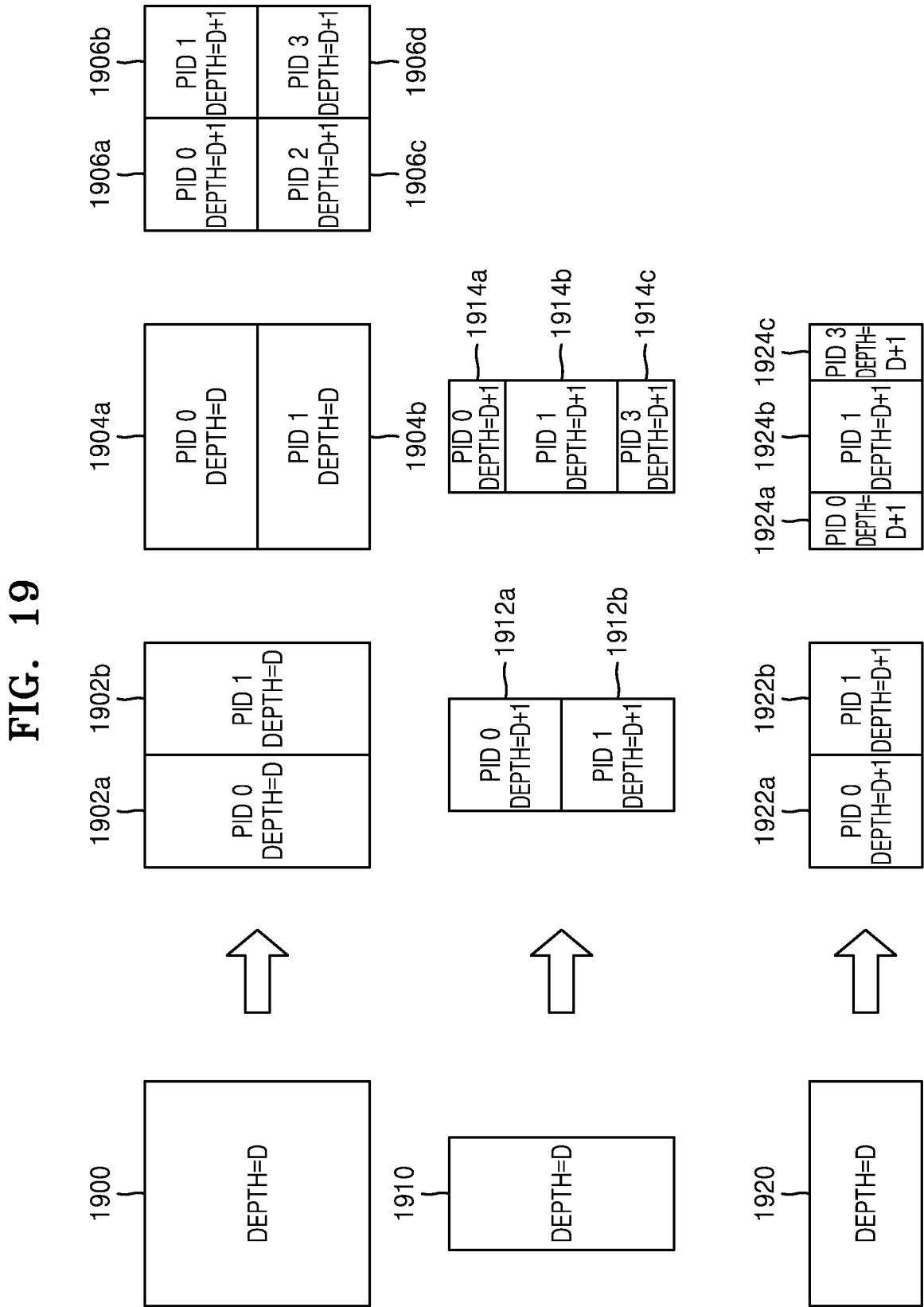
FIG. 19 illustrates depths that are determinable based on shapes and sizes of coding units, and part indexes (PIDs) that are for distinguishing the coding units, according to an embodiment.

FIG. 19 illustrates depths that are determinable based on shapes and sizes of coding units, and part indexes (PIDs) that are for distinguishing the coding units, according to an embodiment.

According to an embodiment, the image decoding apparatus may determine various-shape second coding units by splitting a square first coding unit 1900. Referring to FIG. 19, the image decoding apparatus may determine second coding units 1902a and 1902b, 1904a and 1904b, and 1906a, 1906b, 1906c, and 1906d by splitting the first coding unit 1900 in at least one of vertical and horizontal directions based on split shape mode information. That is, the image decoding apparatus may determine the second coding units 1902a and 1902b, 1904a and 1904b, and 1906a, 1906b, 1906c, and 1906d, based on the split shape mode information of the first coding unit 1900.

According to an embodiment, a depth of the second coding units 1902a and 1902b, 1904a and 1904b, and 1906a, 1906b, 1906c, and 1906d, which are determined based on the split shape mode information of the square first coding unit 1900, may be determined based on the length of a long side thereof. For example, because the length of a side of the square first coding unit 1900 equals the length of a long side of the non-square second coding units 1902a and 1902b, and 1904a and 1904b, the first coding unit 1900 and the non-square second coding units 1902a and 1902b, and 1904a and 1904b may have the same depth, e.g., D. However, when the image decoding apparatus splits the first coding unit 1900 into the four square second coding units 1906a, 1906b, 1906c, and 1906d based on the split shape mode information, because the length of a side of the square second coding units 1906a, 1906b, 1906c, and 1906d is ½ times the length of a side of the first coding unit 1900, a depth of the second coding units 1906a, 1906b, 1906c, and 1906d may be D+1 which is deeper than the depth D of the first coding unit 1900 by 1.

According to an embodiment, the image decoding apparatus may determine a plurality of second coding units 1912a and 1912b, and 1914a, 1914b, and 1914c by splitting a first coding unit 1910, a height of which is longer than a width, in a horizontal direction based on the split shape mode information. According to an embodiment, the image decoding apparatus may determine a plurality of second coding units 1922a and 1922b, and 1924a, 1924b, and 1924c by splitting a first coding unit 1920, a width of which is longer than a height, in a vertical direction based on the split shape mode information.

According to an embodiment, a depth of the second coding units 1912a, 1912b, 1914a, 1914b, 1914c, 1922a, 1922b, 1924a, 1924b, and 1924c, which are determined based on the split shape mode information of the non-square first coding unit 1910 or 1920, may be determined based on the length of a long side thereof. For example, because the length of a side of the square second coding units 1912a and 1912b is ½ times the length of a long side of the first coding unit 1910 having a non-square shape, a height of which is longer than a width, a depth of the square second coding units 1912a and 1912b is D+1 which is deeper than the depth D of the non-square first coding unit 1910 by 1.

Furthermore, the image decoding apparatus may split the non-square first coding unit 1910 into an odd number of second coding units 1914a, 1914b, and 1914c based on the split shape mode information. The odd number of second coding units 1914a, 1914b, and 1914c may include the non-square second coding units 1914a and 1914c and the square second coding unit 1914b. In this case, because the length of a long side of the non-square second coding units 1914a and 1914c and the length of a side of the square second coding unit 1914b are ½ times the length of a long side of the first coding unit 1910, a depth of the second coding units 1914a, 1914b, and 1914c may be D+1 which is deeper than the depth D of the non-square first coding unit 1910 by 1. The image decoding apparatus may determine depths of coding units split from the first coding unit 1920 having a non-square shape, a width of which is longer than a height, by using the above-described method of determining depths of coding units split from the first coding unit 1910.

According to an embodiment, the image decoding apparatus may determine PIDs for identifying split coding units, based on a size ratio between the coding units when an odd number of split coding units do not have equal sizes. Referring to FIG. 19, a coding unit 1914b of a center location among an odd number of split coding units 1914a, 1914b, and 1914c may have a width equal to that of the other coding units 1914a and 1914c and a height which is two times that of the other coding units 1914a and 1914c. That is, in this case, the coding unit 1914b at the center location may include two of the other coding unit 1914a or 1914c. Therefore, when a PID of the coding unit 1914b at the center location is 1 based on a scan order, a PID of the coding unit 1914c located next to the coding unit 1914b may be increased by 2 and thus may be 3. That is, discontinuity in PID values may be present. According to an embodiment, the image decoding apparatus may determine whether an odd number of split coding units do not have equal sizes, based on whether discontinuity is present in PIDs for identifying the split coding units.

According to an embodiment, the image decoding apparatus may determine whether to use a specific splitting method, based on PID values for identifying a plurality of coding units determined by splitting a current coding unit. Referring to FIG. 19, the image decoding apparatus may determine an even number of coding units 1912a and 1912b or an odd number of coding units 1914a, 1914b, and 1914c by splitting the first coding unit 1910 having a rectangular shape, a height of which is longer than a width. The image decoding apparatus may use PIDs to identify respective coding units. According to an embodiment, the PID may be obtained from a sample of a predetermined location of each coding unit (e.g., a top left sample).

According to an embodiment, the image decoding apparatus may determine a coding unit at a predetermined location from among the split coding units, by using the PIDs for distinguishing the coding units. According to an embodiment, when the split shape mode information of the first coding unit 1910 having a rectangular shape, a height of which is longer than a width, indicates to split a coding unit into three coding units, the image decoding apparatus may split the first coding unit 1910 into three coding units 1914a, 1914b, and 1914c. The image decoding apparatus may assign a PID to each of the three coding units 1914a, 1914b, and 1914c. The image decoding apparatus may compare PIDs of an odd number of split coding units to determine a coding unit at a center location from among the coding units. The image decoding apparatus may determine the coding unit 1914b having a PID corresponding to a middle value among the PIDs of the coding units, as the coding unit at the center location from among the coding units determined by splitting the first coding unit 1910. According to an embodiment, the image decoding apparatus may determine PIDs for distinguishing split coding units, based on a size ratio between the coding units when the split coding units do not have equal sizes. Referring to FIG. 19, the coding unit 1914b generated by splitting the first coding unit 1910 may have a width equal to that of the other coding units 1914a and 1914c and a height which is two times that of the other coding units 1914a and 1914c. In this case, when the PID of the coding unit 1914b at the center location is 1, the PID of the coding unit 1914c located next to the coding unit 1914b may be increased by 2 and thus may be 3. When the PID is not uniformly increased as described above, the image decoding apparatus may determine that a coding unit is split into a plurality of coding units including a coding unit having a size different from that of the other coding units. According to an embodiment, when the split shape mode information indicates to split a coding unit into an odd number of coding units, the image decoding apparatus may split a current coding unit in such a manner that a coding unit of a predetermined location among an odd number of coding units (e.g., a coding unit of a centre location) has a size different from that of the other coding units. In this case, the image decoding apparatus may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus may use a predetermined data unit where a coding unit starts to be recursively split.

Figure 20:
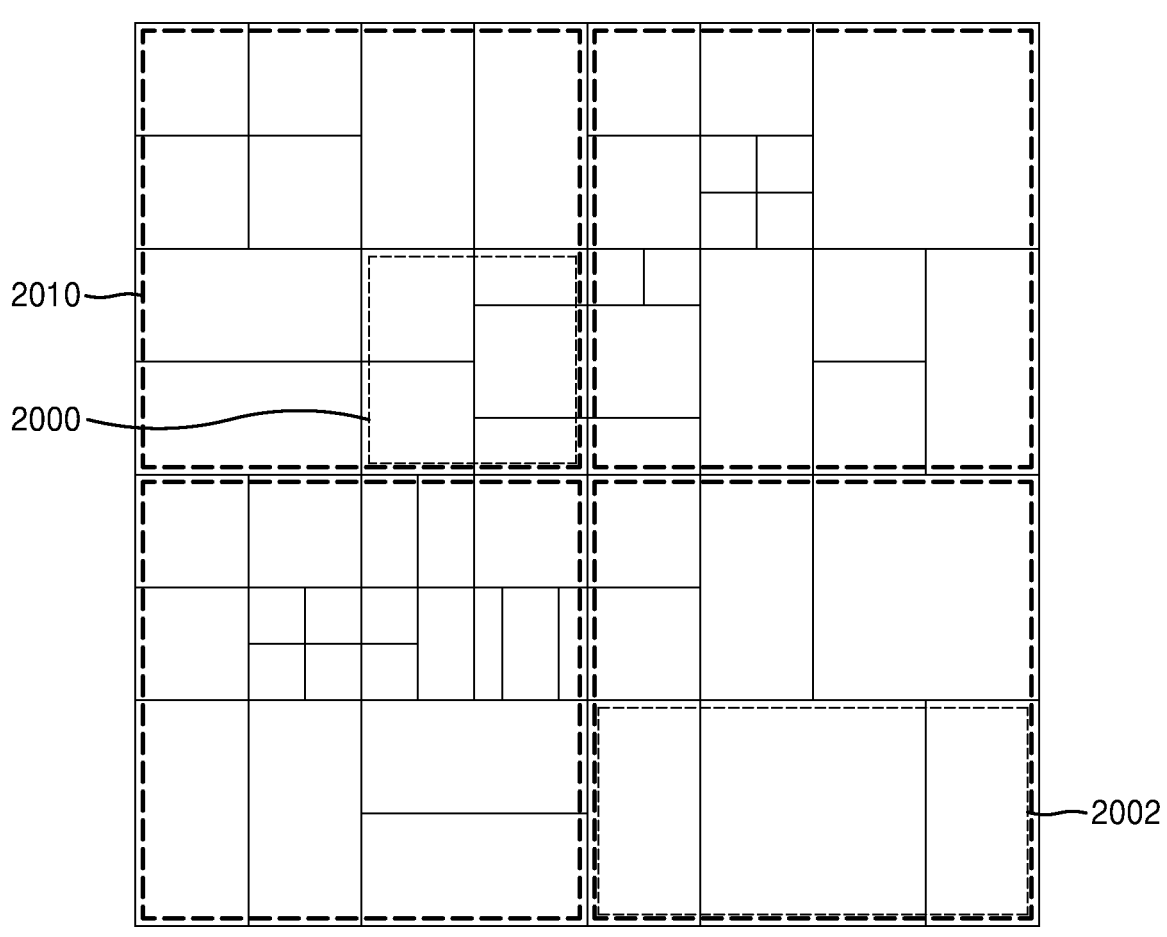
FIG. 20 illustrates that a plurality of coding units are determined based on a plurality of predetermined data units included in a picture, according to an embodiment.

FIG. 20 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as multipliers of 2. That is, the reference data unit may have a square or non-square shape, and may be split into an integer number of coding units.

According to an embodiment, the image decoding apparatus may split the current picture into a plurality of reference data units. According to an embodiment, the image decoding apparatus may split the plurality of reference data units, which are split from the current picture, by using splitting information about each reference data unit. The operation of splitting the reference data unit may correspond to a splitting operation using a quadtree structure.

According to an embodiment, the image decoding apparatus may previously determine the minimum size allowed for the reference data units included in the current picture. Accordingly, the image decoding apparatus may determine various reference data units having sizes equal to or greater than the minimum size, and may determine one or more coding units by using the block shape information and the split shape mode information with reference to the determined reference data unit.

Referring to FIG. 20, the image decoding apparatus may use a square reference coding unit 2000 or a non-square reference coding unit 2002. According to an embodiment, the shape and size of reference coding units may be determined based on various data units capable of including one or more reference coding units (e.g., sequences, pictures, slices, slice segments, largest coding units, or the like).

According to an embodiment, a receiver 110 of the image decoding apparatus may obtain, from a bitstream, at least one of reference coding unit shape information and reference coding unit size information with respect to each of the various data units. An operation of splitting the square reference coding unit 2000 into one or more coding units has been described above in relation to the operation of splitting the current coding unit 300 of FIG. 18, and an operation of splitting the non-square reference coding unit 2002 into one or more coding units has been described above in relation to the operation of splitting the current coding unit 900 or 950 of FIG. 9. Thus, detailed descriptions thereof will not be provided herein.

According to an embodiment, the image decoding apparatus may use a PID for identifying the size and shape of reference coding units, to determine the size and shape of reference coding units according to some data units previously determined based on a predetermined condition. That is, the receiver 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus may determine at least one of the size and shape of reference coding units included in a data unit serving as a unit for obtaining the PID, by selecting the previously determined based on at least one of the size and shape of reference coding units based on the PID.

According to an embodiment, the image decoding apparatus may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus may determine the reference coding units by splitting the largest coding unit n times based on a quadtree structure, and may split the reference coding unit based on at least one of the block shape information and the split shape mode information according to various embodiments.

Figure 21:
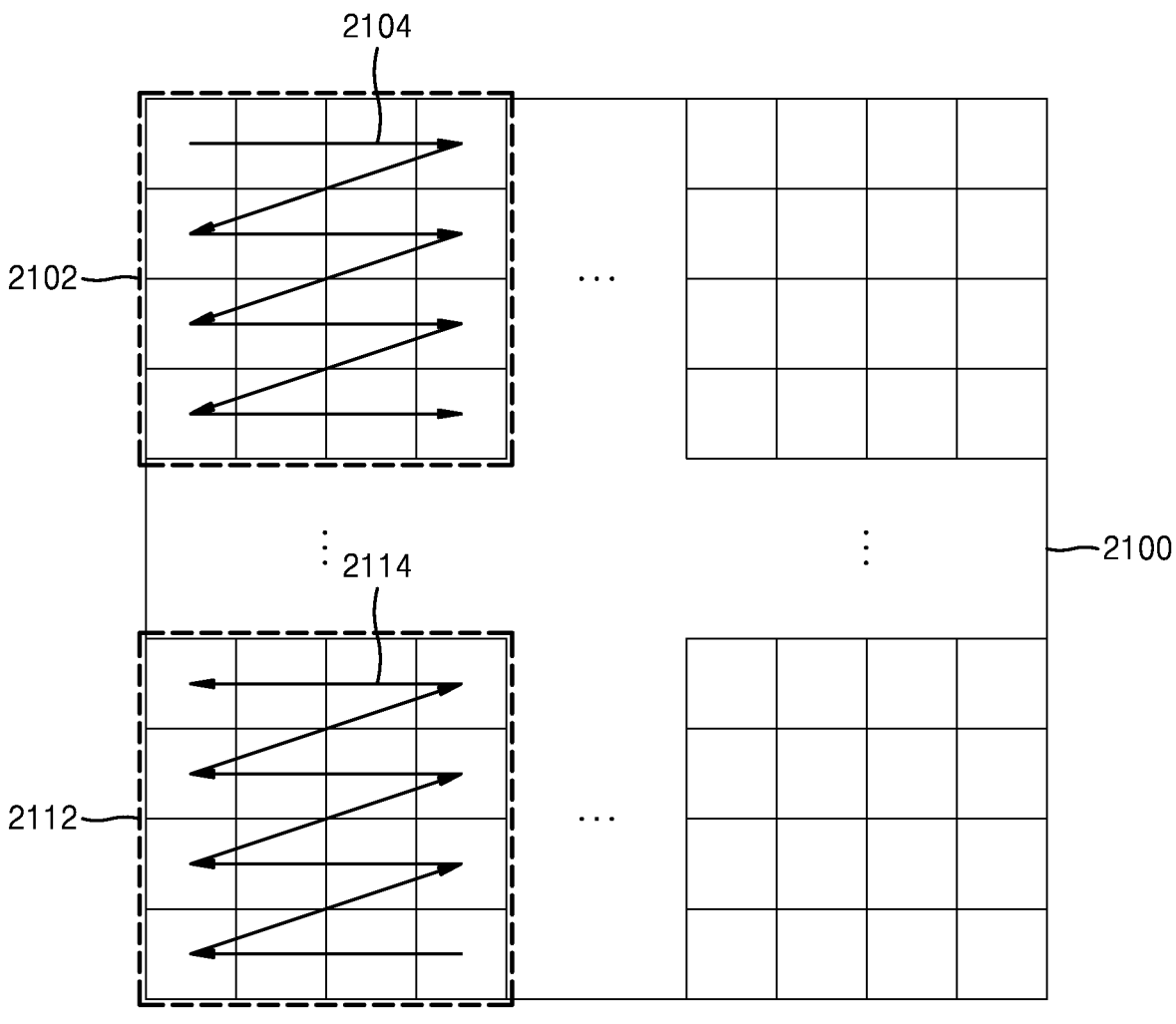
FIG. 21 illustrates a processing block serving as a unit for determining a determination order of reference coding units included in a picture, according to an embodiment.

FIG. 21 illustrates a processing block serving as a unit for determining a determination order of reference coding units included in a picture 2100, according to an embodiment.

According to an embodiment, the image decoding apparatus may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus may obtain processing block size information and may determine the size of one or more processing blocks included in the picture. The image decoding apparatus may obtain the processing block size information from a bitstream and may determine the size of one or more processing blocks included in the picture. The size of processing blocks may be a predetermined size of data units, which is indicated by the processing block size information.

According to an embodiment, the receiver 110 of the image decoding apparatus may obtain the processing block size information from the bitstream according to each specific data unit. For example, the processing block size information may be obtained from the bitstream in a data unit such as an image, sequence, picture, slice, or slice segment. That is, the receiver 110 may obtain the processing block size information from the bitstream according to each of the various data units, and the image decoding apparatus may determine the size of one or more processing blocks, which are split from the picture, by using the obtained processing block size information. The size of the processing blocks may be integer times that of the reference coding units.

According to an embodiment, the image decoding apparatus may determine the size of processing blocks 2102 and 2112 included in the picture 2100. For example, the image decoding apparatus may determine the size of processing blocks based on the processing block size information obtained from the bitstream. Referring to FIG. 21, according to an embodiment, the image decoding apparatus may determine a width of the processing blocks 2102 and 2112 to be four times the width of the reference coding units, and may determine a height of the processing blocks 2102 and 2112 to be four times the height of the reference coding units. The image decoding apparatus may determine a determination order of one or more reference coding units in one or more processing blocks.

According to an embodiment, the image decoding apparatus may determine the processing blocks 2102 and 2112, which are included in the picture 2100, based on the size of processing blocks, and may determine a determination order of one or more reference coding units in the processing blocks 2102 and 2112. According to an embodiment, determination of reference coding units may include determination of the size of the reference coding units.

According to an embodiment, the image decoding apparatus may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus may obtain, from the bitstream, the determination order information of reference coding units according to each specific data unit. For example, the receiver 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus may determine one or more reference coding units based on the determined determination order.

According to an embodiment, the receiver 110 may obtain the determination order information of reference coding units from the bitstream as information related to the processing blocks 2102 and 2112, and the image decoding apparatus may determine a determination order of one or more reference coding units included in the processing blocks 2102 and 2112 and determine one or more reference coding units, which are included in the picture 2100, based on the determination order. Referring to FIG. 21, the image decoding apparatus may determine determination orders 2104 and 2114 of one or more reference coding units in the processing blocks 2102 and 2112, respectively. For example, when the determination order information of reference coding units is obtained with respect to each processing block, different types of the determination order information of reference coding units may be obtained for the processing blocks 2102 and 2112. When the determination order 2104 of reference coding units in the processing block 2102 is a raster scan order, reference coding units included in the processing block 2102 may be determined according to a raster scan order. On the contrary, when the determination order 2114 of reference coding units in the other processing block 2112 is a backward raster scan order, reference coding units included in the processing block 2112 may be determined according to the backward raster scan order.

According to an embodiment, the image decoding apparatus may decode the determined one or more reference coding units. The image decoding apparatus may decode an image, based on the reference coding units determined as described above. A method of decoding the reference coding units may include various image decoding methods.

According to an embodiment, the image decoding apparatus may obtain block shape information indicating the shape of a current coding unit or split shape mode information indicating a splitting method of the current coding unit, from the bitstream, and may use the obtained information. The block shape information or the split shape mode information may be included in the bitstream related to various data units. For example, the image decoding apparatus may use the block shape information or the split shape mode information included in a sequence parameter set, a picture parameter set, a video parameter set, a slice header, or a slice segment header. Furthermore, the image decoding apparatus may obtain, from the bitstream, syntax corresponding to the block shape information or the split shape mode information according to each largest coding unit, each reference coding unit, or each processing block, and may use the obtained syntax.

While the disclosure has been particularly shown and described with reference to embodiments thereof, it will be understood by those of ordinary skill in the art that various changes in form and detail may be made therein without departing from the spirit and scope of the disclosure as defined by the following claims. Thus, the embodiments should be considered in a descriptive sense only and not for purposes of limitation. Therefore, the scope of the disclosure is defined not by the detailed description of the disclosure but by the appended claims, and all differences within the scope will be construed as being included in the disclosure.

The method may be embodied as a program executed in a computer, and may be implemented in a general-purpose digital computer for executing the program by using a computer-readable recording medium. The computer-readable recording medium may include magnetic storage media (e.g., read-only memories (ROMs), floppy disks, hard disks, etc.) and optical recording media (e.g., compact disk (CD)-ROMs, digital versatile disks (DVDs), etc.).

The invention claimed is:

1. An image decoding method supporting a coding unit having a size of 128×128, the image decoding method being performed by an apparatus and comprising:

when a width and a height of a current unit are equal to or less than 64, obtaining, from a bitstream, second transform information for the current unit, wherein the second transform information indicates whether and which one among a plurality of second transform matrices is used, wherein the second transform information being equal to zero indicates that an inverse second transform is not performed for the current unit, wherein the second transform information being not equal to zero indicates a second transform matrix among the plurality of second transform matrices, and wherein, when the width and the height of the current unit are equal to 128, the second transform information for the current unit is not obtained from the bitstream and the inverse second transform is not performed for the current unit;

when the second transform information is not equal to zero, determining the second transform matrix among the plurality of second transform matrices based on the second transform information;

obtaining a first transform coefficient block by performing the inverse second transform based on a second transform coefficient block and the second transform matrix; and obtaining a residual block for the current unit by performing an inverse first transform based on the first transform coefficient block.

2. The image decoding method of claim 1, wherein the second transform information is decoded based on any one of a context-based adaptive binary arithmetic coding (CABAC) method, a fixed length method, and a unary method, and wherein the CABAC method includes context modeling based on second transform information of a peripheral block of the first transform coefficient block.

3. The image decoding method of claim 1, wherein the obtaining of the first transform coefficient block by performing the inverse second transform comprises inverse-rearranging a coefficient of the first transform coefficient block by performing the inverse second transform based on the second transform matrix.

4. The image decoding method of claim 1, wherein:

the obtaining of the first transform coefficient block by performing the inverse second transform includes obtaining the first transform coefficient block by performing the inverse second transform based on at least a portion of the second transform coefficient block, and the second transform coefficient block is a coefficient block having a size of a ratio of 1:N or N:1, wherein the Nis a natural number.

5. An image encoding method supporting a coding unit having a size of 128×128, the image encoding method being performed by an apparatus and comprising:

obtaining a first transform coefficient block by performing a first transform based on a residual block for a current unit;

determining a second transform matrix among a plurality of second transform matrices;

obtaining a second transform coefficient block by performing a second transform based on the first transform coefficient block and the second transform matrix; and when a width and a height of the current unit are equal to or less than 64, encoding second transform information for the current unit into a bitstream, wherein the second transform information indicates whether and which one among the plurality of second transform matrices is used, wherein the second transform information being equal to zero indicates that an inverse second transform is not performed for the current unit, wherein the second transform information being not equal to zero indicates the second transform matrix among the plurality of second transform matrices, and wherein, when the width and the height of the current unit are equal to 128, the second transform information for the current unit is not encoded into the bitstream and the second transform is not performed for the current unit.

6. A non-transitory storage medium storing instructions that, when executed by a processor of an apparatus, cause the apparatus to perform an image encoding method supporting a coding unit having a size of 128×128, the image encoding method comprising:

obtaining a first transform coefficient block by performing a first transform based on a residual block for a current unit;

determining a second transform matrix among a plurality of second transform matrices;

obtaining a second transform coefficient block by performing a second transform based on the first transform coefficient block and the second transform matrix; and when a width and a height of the current unit are equal to or less than 64, encoding second transform information for the current unit into a bitstream, wherein the second transform information indicates whether and which one among the plurality of second transform matrices is used, wherein the second transform information being equal to zero indicates that an inverse second transform is not performed for the current unit, wherein the second transform information being not equal to zero indicates the second transform matrix among the plurality of second transform matrices, and wherein, when the width and the height of the current unit are equal to 128, the second transform information for the current unit is not encoded into the bitstream and the second transform is not performed for the current unit.

* * * * *